United States Patent
Sanchez De La Fuente et al.

(10) Patent No.: US 12,501,062 B2
(45) Date of Patent: Dec. 16, 2025

(54) VIDEO ENCODER, VIDEO DECODER, METHODS FOR ENCODING AND DECODING AND VIDEO DATA STREAM FOR REALIZING ADVANCED VIDEO CODING CONCEPTS

(71) Applicant: Dolby Video Compression, LLC, Wilmington, DE (US)

(72) Inventors: Yago Sanchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: Dolby Video Compression, LLC, Wilmington, DE (US)

( * ) Notice: Subject to any disclaimer, the term of this patent is extended or adjusted under 35 U.S.C. 154(b) by 0 days.

(21) Appl. No.: 17/981,969

(22) Filed: Nov. 7, 2022

(65) Prior Publication Data

US 2023/0092331 A1    Mar. 23, 2023

Related U.S. Application Data

(63) Continuation of application No. PCT/EP2021/063587, filed on May 21, 2021.

(30) Foreign Application Priority Data

May 22, 2020   (EP) .................................... 20176178
May 22, 2020   (EP) .................................... 20176206

(51) Int. Cl.
*H04N 19/184*    (2014.01)
*H04N 19/169*    (2014.01)
(Continued)

(52) U.S. Cl.
CPC ......... *H04N 19/423* (2014.11); *H04N 19/172* (2014.11); *H04N 19/184* (2014.11);
(Continued)

(58) Field of Classification Search
CPC ...... H04N 19/30; H04N 19/188; H04N 19/70; H04N 19/184; H04N 19/172
See application file for complete search history.

(56) References Cited

U.S. PATENT DOCUMENTS 8,204,134 B2 *   6/2012   Hannuksela ......... H04N 19/587
                                                                375/240.27
8,542,492 B2 *   9/2013   Dunn, Jr. ................ G06F 1/206
                                                                324/309
(Continued)

FOREIGN PATENT DOCUMENTS

ES          2973667 T3       6/2024
JP      WO2015/053157 A1     3/2017
(Continued)

OTHER PUBLICATIONS

SVC temporal layer switching points; Wang—2007. (Year: 2007).*
(Continued)

*Primary Examiner* — Luis Perez-Fuentes
(74) *Attorney, Agent, or Firm* — Morgan, Lewis & Bockius LLP

(57) ABSTRACT

An apparatus (200) for receiving an input video data stream according to an embodiment is provided. The input video data stream has a video encoded thereto. The apparatus (200) is configured to generate an output video data stream from the input video data stream.

21 Claims, 10 Drawing Sheets

(51) Int. Cl.
   *H04N 19/172* (2014.01)
   *H04N 19/423* (2014.01)
   *H04N 19/44* (2014.01)
   *H04N 19/46* (2014.01)
   *H04N 19/70* (2014.01)
   *H04N 19/85* (2014.01)

(52) U.S. Cl.
   CPC ........... *H04N 19/188* (2014.11); *H04N 19/44* (2014.11); *H04N 19/46* (2014.11); *H04N 19/70* (2014.11); *H04N 19/85* (2014.11)

(56) References Cited

U.S. PATENT DOCUMENTS

| | | | |
|---|---|---|---|
| 8,594,202 B2 * | 11/2013 | Eleftheriadis | H04N 21/2662 375/240.26 |
| 9,154,785 B2 * | 10/2015 | Wang | H04N 19/70 |
| 9,270,989 B2 * | 2/2016 | Hannuksela | H04N 19/70 |
| 9,521,393 B2 * | 12/2016 | Wang | H04N 13/161 |
| 9,641,862 B2 | 5/2017 | Hannuksela | |
| 9,712,833 B2 * | 7/2017 | Wang | H04N 19/70 |
| 9,894,370 B2 * | 2/2018 | Wang | H04N 19/60 |
| 10,003,815 B2 | 6/2018 | Ramasubramonian et al. | |
| 10,021,394 B2 | 7/2018 | Wang | |
| 10,284,858 B2 | 5/2019 | Chen et al. | |
| 10,432,951 B2 * | 10/2019 | Wang | H04N 19/152 |
| 11,356,681 B2 * | 6/2022 | Choi | H04N 19/105 |
| 11,936,889 B2 | 3/2024 | Skupin et al. | |
| 11,956,471 B2 | 4/2024 | Pettersson et al. | |
| 2008/0013620 A1 | 1/2008 | Hannuksela | |
| 2012/0294366 A1 | 11/2012 | Eliyahu | |
| 2013/0266075 A1 | 10/2013 | Wang et al. | |
| 2014/0098894 A1 | 4/2014 | Wang | |
| 2014/0192149 A1 | 7/2014 | Wang et al. | |
| 2014/0192893 A1 | 7/2014 | Sullivan et al. | |
| 2014/0355692 A1 | 12/2014 | Ramasubramonian et al. | |
| 2015/0016547 A1 | 1/2015 | Tabatabai et al. | |
| 2015/0103895 A1 | 4/2015 | Deshpande | |
| 2016/0234526 A1 | 8/2016 | Wang | |
| 2021/0368183 A1 | 11/2021 | Deshpande | |
| 2021/0385472 A1 | 12/2021 | Seregin et al. | |
| 2022/0141494 A1 | 5/2022 | Deshpande | |
| 2022/0217375 A1 * | 7/2022 | Wang | H04N 21/235 |
| 2022/0217376 A1 | 7/2022 | Wang | |
| 2022/0217393 A1 * | 7/2022 | Wang | H04N 19/46 |

FOREIGN PATENT DOCUMENTS

| | | |
|---|---|---|
| RU | 2 406 254 C2 | 8/2010 |
| WO | 2015/104451 A1 | 7/2015 |
| WO | 2015/140401 A1 | 9/2015 |
| WO | 2015/192990 A1 | 12/2015 |
| WO | 2020/253816 A1 | 12/2020 |
| WO | 2021/123159 A1 | 6/2021 |

OTHER PUBLICATIONS

Showcase of temporal level nesting flag; Eleftheriadis—2007. (Year: 2007).*
Showcase of temporal level switching point SEI message; Wang—2007. (Year: 2007).*
International Search Report and Written Opinion dated Jul. 23, 2021 for International Patent Application No. PCT/EP2021/063587, 17 pages.
Pettersson M et al. "HLS: Dependent RAP indication SEI message" 18. JCT-VC Meeting; Jun. 30, 2014-Jul. 9, 2014; Sapporo; (Joint Collaborative Team on Video Coding of ISo/IEC JTC1/SC29/WG11 and ITU-T SG.16); URL: http://wftp3.itu.int/av-arch/jctvc-site/,, No. JCTVC-R00059, Jun. 19, 2014 (Jun. 19, 2014_, XP030116302, abstract Chapter 2.1.
Notice of Allowance issued in corresponding Taiwanese Patent Application No. 110118547 dated Jan. 7, 2023, with English translation.
Office Action issued in corresponding Australian Patent Application No. 2022271427 dated Jan. 5, 2023.
Office Action issued in corresponding Australian Patent Application No. 2022271423 dated Jan. 10, 2023.
Office Action issued in corresponding Australian Patent Application 2021277524 dated Dec. 20, 2022.
Office Action issued in corresponding Eurasian Patent Application 202293010 dated Dec. 21, 2022, with English translation.
Notice of Allowance issued in corresponding U.S. Appl. No. 17/934,007 dated Jun. 7, 2023.
Office Action issued in corresponding Uzbek Patent Application IAP 2023 0017 dated Apr. 25, 2023.
Office Action issued in corresponding Uzbek Patent Application IAP 2023 0018 dated Apr. 25, 2023.
Office Action issued in corresponding Eurasian Patent Application 202293135 dated Mar. 22, 2023, with English translation.
Sanchez Yago et al. AHG9: On OLS extraction and scalable nesting SEI message. Joint Video Experts Team (JVET) of ITU-T SG16 WP3 and ISO/IEC JTC1/SC29/WG11. JVET-Q0394. 17th Meeting: Brussels Jan. 7-17, 2020, section 2-4.
Office Action issued in corresponding Eurasian Patent Application 202293134 dated Mar. 22, 2023, with English translation.
Wang, Ye-Kui, AHG8/AHG17: Scalable nesting SEI message. Joint Video Experts Team (JVET) of ITU-T SG16 WP3 and ISO/IEC JTC1/SC29/WG11. JVET-P0190-v2. 16th Meeting: Geneva, Oct. 1-11, 2019, pp. 1-4.
Skupin, Robert et al., AHG12: On subpicture extraction. Joint Video Experts Team (JVET) of ITU-T SG16 WP3 and ISO/IEC JTC1/SC29/WG11. JVET-Q0397-v3. 17th Meeting: Brussels, Jan. 7-17, 2020, section 2-4.
Office Action issued in corresponding U.S. Appl. No. 17/934,007 dated Mar. 30, 2023.
Office Action issued in corresponding U.S. Appl. No. 17/982,015 dated Apr. 26, 2023.
Office Action issued in corresponding Eurasian Patent Application 202293010 dated Jul. 7, 2023, with English translation.
Office Action is issued in corresponding Georgian Patent Application 16098/1 dated Jul. 1, 2023, with English translation.
Wang, Y-K., et al., "AHG9: General SEI semantics and constraints", 19, JVET Meeting by teleconference, Jun. 22, 2020-Jul. 1, 2020, Document JVET-S0178-v2 (4 pages).
Suehring, K., et al., "AHG17: Parsing of HRD related SEI messages", 14, JVET Meeting, Geneva, Mar. 19-27, 2019, Document JVET-N0353 (5 pages).
Martin Pettersson et al., "Dependent random access point pictures in HEVC", 2015 IEEE International Conference on Image Processing (ICIP), Sep. 27-30, 2015.
Notice of Acceptance for patent application issued in corresponding Australian Application No. 2021277524 dated Mar. 31, 2023.
Sullivan, G. J., et al., "Overview of the High Efficiency Video Coding (HEVC) Standard", IEEE Transactions on Circuits and Systems for Video Technology (2012).
International Telecommunication Union, "Series H: Audiovisual and Multimedia Systems Infrastructure of audiovisual services—Coding of moving video", ITU-T H.265, Telecommunication Standardization Sector of ITU, High efficiency video coding, ISO/IEC 23008-2 (HEVC/H.265) standard, (Apr. 2015).

* cited by examiner

VIDEO ENCODER, VIDEO DECODER, METHODS FOR ENCODING AND DECODING AND VIDEO DATA STREAM FOR REALIZING ADVANCED VIDEO CODING CONCEPTS

CROSS REFERENCE TO RELATED APPLICATIONS

This application is a Continuation of International Application No. PCT/EP2021/063587 filed on May 21 2021, which claims the benefit of priority to EP patent application No. 20176178.0 filed May 22, 2020 and EP patent application No. 20176206.9 filed May 22, 2020, each of which is incorporated by reference herein in its entirety.

The present invention relates to video encoding and video decoding and, in particular, to a video encoder, to a video decoder, to methods for encoding and decoding and to a video data stream for realizing advanced video coding concepts.

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following, an introduction to VCL partitioning according to the state-of-the-art is described (VCL=video coding layer).

Typically, in video coding, a coding process of picture samples requires smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

Other examples relate to RoI (RoI=Region of Interest) encodings, where there is for example a region in the middle of the picture that viewers can select e.g. with a zoom in operation (decoding only the RoI), or gradual decoder refresh (GDR) in which intra data (that is typically put into one frame of a video sequence) is temporally distributed over several successive frames, e.g. as a column of intra blocks that swipes over the picture plane and resets the temporal prediction chain locally in the same fashion as an intra picture does it for the whole picture plane. For the latter, two regions exist in each picture, one that is recently reset and one that is potentially affected by errors and error propagation.

Reference Picture Resampling (RPR) is a technique used in video coding to adapt the quality/rate of the video not only by using a coarser quantization parameter but by adapting the resolution of potentially each transmitted picture. Thus, references used for inter prediction might have a different size that the picture that is currently being predicted for encoding. Basically, RPR requires a resampling process in the prediction loop, e.g., upsampling and downsampling filters to be defined.

Depending on flavor, RPR can result in a change of coded picture size at any picture, or be limited to happen at only some particular picture, e.g. only at particular positions bounded for instance to segment boundaries adaptive HTTP streaming.

The object of the present invention is to provide improved concepts for video encoding and video decoding.

The object of the present invention is solved by the subject-matter of the independent claims.

In accordance with a first aspect of the invention, an apparatus for receiving an input video data stream is provided. The input video data stream has a video encoded thereinto. The apparatus is configured to generate an output video data stream from the input video data stream. Moreover, the apparatus is to determine whether a picture of the video preceding a dependent random access picture shall be output or not.

Moreover, a video data stream is provided. The video data stream has a video encoded thereinto. The video data stream comprises an indication that indicates whether a picture of the video preceding a dependent random access picture shall be output or not.

Furthermore, a video encoder is provided. The video encoder is configured to encode a video into a video data stream. Moreover, the video encoder is configured to generate the video data stream such that the video data stream comprises an indication that indicates whether a picture of the video preceding a dependent random access picture shall be output or not.

Moreover, a video decoder for receiving a video data stream having a video stored therein is provided. The video decoder is configured to decode the video from the video data stream. The video decoder is configured to decode the video depending on an indication indicating whether a picture of the video preceding a dependent random access picture shall be output or not.

Furthermore, a method for receiving an input video data stream is provided. The input video data stream has a video encoded thereinto. The method comprises generating an output video data stream from the input video data stream. Moreover, the method comprises determining whether a picture of the video preceding a dependent random access picture shall be output or not.

Moreover, a method for encoding a video into a video data stream is provided. The method comprises generating the video data stream such that the video data stream comprises an indication that indicates whether a picture of the video preceding a dependent random access picture shall be output or not.

Furthermore, a method for receiving a video data stream having a video stored therein is provided. The method comprises decoding the video from the video data stream. Decoding the video is conducted depending on an indication indicating whether a picture of the video preceding a dependent random access picture shall be output or not.

Moreover, computer programs for implementing one of the above-described methods when being executed on a computer or signal processor are provided.

In accordance with a second aspect of the invention, an apparatus for receiving one or more input video data streams is provided. Each of the one or more input video data streams has an input video encoded thereinto. The apparatus is configured to generate an output video data stream from the one or more input video data streams, the output video data stream encoding an output video, wherein the apparatus is configured to generate the output video data stream such that the output video is the input video being encoded within one of the one or more input video data streams, or such that the output video depends on the input video of at least one of the one or more input video data streams. Moreover, the apparatus is configured to determine an access unit removal time of a current picture of a plurality of pictures of the output video from a coded picture buffer. The apparatus is configured to determine whether or not to use coded picture buffer delay offset information for determining the access unit removal time of the current picture from the coded picture buffer.

Furthermore, a video data stream is provided. The video data stream has a video encoded thereinto. The video data stream comprises coded picture buffer delay offset information.

Furthermore, a video decoder for receiving a video data stream a video stored therein is provided. The video decoder is configured to decode the video from the video data stream. Moreover, the video decoder is configured to decode the video depending on an access unit removal time of a current picture of a plurality of pictures of the video from a coded picture buffer. The video decoder is configured to decode the video depending on an indication indicating whether or not to use coded picture buffer delay offset information for determining the access unit removal time of the current picture from the coded picture buffer.

Moreover, a method for receiving one or more input video data streams is provided. Each of the one or more input video data streams has an input video encoded thereinto. The method comprises generating an output video data stream from the one or more input video data streams, the output video data stream encoding an output video, wherein generating the output video data stream is conducted such that the output video is the input video being encoded within one of the one or more input video data streams, or such that the output video depends on the input video of at least one of the one or more input video data streams. Moreover, the method comprises determining an access unit removal time of a current picture of a plurality of pictures of the output video from a coded picture buffer. Furthermore, the method comprises determining whether or not to use coded picture buffer delay offset information for determining the access unit removal time of the current picture from the coded picture buffer.

Furthermore, a method for encoding a video into a video data stream according to an embodiment is provided. The method comprises generating the video data stream such that the video data stream comprises coded picture buffer delay offset information.

Moreover, a method for receiving a video data stream a video stored therein is provided. The method comprises decoding the video from the video data stream. Decoding the video is conducted depending on an access unit removal time of a current picture of a plurality of pictures of the video from a coded picture buffer. Moreover, decoding the video is conducted depending on an indication indicating whether or not to use coded picture buffer delay offset information for determining the access unit removal time of the current picture from the coded picture buffer.

Furthermore, computer programs for implementing one of the above-described methods when being executed on a computer or signal processor are provided.

In accordance with a third aspect of the invention, a video data stream is provided. The video data stream has a video encoded thereinto. Moreover, the video data stream comprises an initial coded picture buffer removal delay. Furthermore, the video data stream comprises an initial coded picture buffer removal offset. Moreover, the video data stream comprises information that indicates whether or not a sum of the initial coded picture buffer removal delay and the initial coded picture buffer removal offset is defined to be constant across two or more buffering periods.

Furthermore, a video encoder is provided. The video encoder is configured to encode a video into a video data stream. Moreover, the video encoder is configured to generate the video data stream such that the video data stream comprises an initial coded picture buffer removal delay. Furthermore, the video encoder is configured to generate the video data stream such that the video data stream comprises an initial coded picture buffer removal offset. Moreover, the video encoder is configured to generate the video data stream such that the video data stream comprises information that indicates whether or not a sum of the initial coded picture buffer removal delay and the initial coded picture buffer removal offset is defined to be constant across two or more buffering periods.

Moreover, an apparatus for receiving two input video data streams, being a first input video data stream and a second input video data stream, is provided. Each of the two input video data streams has an input video encoded thereinto. The apparatus is configured to generate an output video data stream from the two input video data streams, the output video data stream encoding an output video, wherein the apparatus is configured to generate an output video data stream by concatenating the first input video data stream and the second input video data stream. Moreover, the apparatus is configured to generate the output video data stream such that the output video data stream comprises an initial coded picture buffer removal delay. Furthermore, the apparatus is configured to generate the output video data stream such that the output video data stream comprises an initial coded picture buffer removal offset. Moreover, the apparatus is configured to generate the output video data stream such that the output video data stream comprises information that indicates whether or not a sum of the initial coded picture buffer removal delay and the initial coded picture buffer removal offset is defined to be constant across two or more buffering periods.

Furthermore, a video decoder for receiving a video data stream a video stored therein is provided. The video decoder is configured to decode the video from the video data stream.

Moreover, the video data stream comprises an initial coded picture buffer removal delay. Furthermore, the video data stream comprises an initial coded picture buffer removal offset. Moreover, the video data stream comprises information that indicates whether or not a sum of the initial coded picture buffer removal delay and the initial coded picture buffer removal offset is defined to be constant across two or more buffering periods. Furthermore, the video decoder is configured to decode the video depending on the information that indicates whether or not the sum of the initial coded picture buffer removal delay and the initial coded picture buffer removal offset is defined to be constant across the two or more buffering periods.

Moreover, a method for encoding a video into a video data stream is provided. The method comprises generating the video data stream such that the video data stream comprises an initial coded picture buffer removal delay. Furthermore, the method comprises generating the video data stream such that the video data stream comprises an initial coded picture buffer removal offset. Moreover, the method comprises generating the video data stream such that the video data stream comprises information that indicates whether or not a sum of the initial coded picture buffer removal delay and the initial coded picture buffer removal offset is defined to be constant across two or more buffering periods.

Furthermore, a method for receiving two input video data streams, being a first input video data stream and a second input video data stream, is provided. Each of the two input video data streams has an input video encoded thereinto. The method comprises generating an output video data stream from the two input video data streams, the output video data stream encoding an output video, wherein the apparatus is configured to generate an output video data stream by concatenating the first input video data stream and the second input video data stream. Moreover, the method comprises generating the output video data stream such that the output video data stream comprises an initial coded picture buffer removal delay. Furthermore, the method comprises generating the output video data stream such that the output video data stream comprises an initial coded picture buffer removal offset. Moreover, the method comprises generating the output video data stream such that the output video data stream comprises information that indicates whether or not a sum of the initial coded picture buffer removal delay and the initial coded picture buffer removal offset is defined to be constant across two or more buffering periods.

Moreover, a method for receiving a video data stream a video stored therein is provided. The method comprises decoding the video from the video data stream. The video data stream comprises an initial coded picture buffer removal delay. Moreover, the video data stream comprises an initial coded picture buffer removal offset. Furthermore, the video data stream comprises information that indicates whether or not a sum of the initial coded picture buffer removal delay and the initial coded picture buffer removal offset is defined to be constant across two or more buffering periods. The method comprises decoding the video depending on the information that indicates whether or not the sum of the initial coded picture buffer removal delay and the initial coded picture buffer removal offset is defined to be constant across the two or more buffering periods.

Furthermore, computer programs for implementing one of the above-described methods when being executed on a computer or signal processor are provided.

In accordance with a fourth aspect of the invention, a video data stream is provided. The video data stream has a video encoded thereinto. Moreover, the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Moreover, a video encoder is provided. The video encoder is configured to encode a video into a video data stream. Moreover, the video encoder is configured to generate the video data stream such that the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Furthermore, an apparatus for receiving an input video data stream is provided. The input video data stream has a video encoded thereinto. The apparatus is configured to generate an processed video data stream from the input video data stream. Moreover, the apparatus is configured to generate the processed video data stream such that the processed video data stream comprises an indication indicating whether or not a non-scalable nested picture timing supplemental enhancement information message of a network abstraction layer unit of an access unit of the plurality of access units of a coded video sequence of a one or more coded video sequences of the processed video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Moreover, a video decoder for receiving a video data stream having a video stored therein is provided. The video decoder is configured to decode the video from the video data stream. The video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Furthermore, a method for encoding a video into a video data stream is provided. The method comprises generating the video data stream such that the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Moreover, a method for receiving an input video data stream is provided. The input video data stream has a video encoded thereinto. The method comprises generating an processed video data stream from the input video data stream. Moreover, the method comprises generating the processed video data stream such that the processed video data stream comprises an indication indicating whether or not a non-scalable nested picture timing supplemental enhancement information message of a network abstraction layer unit of an access unit of the plurality of access units of a coded video sequence of a one or more coded video sequences of the processed video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Furthermore, a method for receiving a video data stream having a video stored therein is provided. The method comprises decoding the video from the video data stream. The video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication has a first value, then the non-scalable nested picture timing supplemental enhancement information message of said network abstraction layer unit of said access unit is defined to apply to all output layer sets of the plurality of output layer sets of said access unit. If the indication has a value being different from the first value, then the indication does not define whether or not the non-scalable nested picture timing supplemental enhancement information message of said network abstraction layer unit of said access unit applies to all output layer sets of the plurality of output layer sets of said access unit.

Moreover, computer programs for implementing one of the above-described methods when being executed on a computer or signal processor are provided.

In accordance with a fifth aspect of the invention, a video data stream is provided. The video data stream has a video encoded thereinto. Moreover, the video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream.

Moreover, a video encoder is provided. The video encoder is configured to encode a video into a video data stream. Moreover, the video encoder is configured to generate the video data stream such that the video data stream comprises one or more scalable nested supplemental enhancement information messages. Furthermore, the video encoder is configured to generate the video data stream such that the one or more scalable nested supplemental enhancement information messages comprise a plurality of syntax elements. Moreover, the video encoder is configured to generate the video data stream such that each syntax element of one or more syntax elements of the plurality of syntax elements is defined to have a same size in every one of the scalable nested supplemental enhancement information messages of the video data stream or of a portion of the video data stream.

Furthermore, an apparatus for receiving an input video data stream is provided. The input video data stream has a video encoded thereinto. The apparatus is configured to generate an output video data stream from the input video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream.

The apparatus is configured to process the one or more scalable nested supplemental enhancement information messages.

Moreover, a video decoder for receiving a video data stream having a video stored therein is provided. The video decoder is configured to decode the video from the video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream. The video decoder is configured to decode the video depending on the one or more syntax elements of the plurality of syntax elements.

Furthermore, a method for encoding a video into a video data stream is provided. The method comprises generating the video data stream such that the video data stream comprises one or more scalable nested supplemental enhancement information messages. Moreover, the method comprises generating the video data stream such that the one or more scalable nested supplemental enhancement information messages comprise a plurality of syntax elements. Furthermore, the method comprises generating the video data stream such that each syntax element of one or more syntax elements of the plurality of syntax elements is defined to have a same size in every one of the scalable nested supplemental enhancement information messages of the video data stream or of a portion of the video data stream.

Moreover, a method for receiving an input video data stream is provided. The input video data stream has a video encoded thereinto. The method comprises generating an output video data stream from the input video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream. The method comprises processing the one or more scalable nested supplemental enhancement information messages.

Furthermore, a method for receiving a video data stream having a video stored therein is provided. The method comprises decoding the video from the video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream. Decoding the video is conducted depending on the one or more syntax elements of the plurality of syntax elements.

Moreover, computer programs for implementing one of the above-described methods when being executed on a computer or signal processor are provided.

Preferred embodiments are provided in the dependent claims.

In the following, embodiments of the present invention are described in detail with reference to the figures, in which.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 8 to FIG. 10. Thereinafter the description of embodiments of the concept of the present invention is presented along with a description as to how such concepts could be built into the encoder and decoder of FIG. 8 and FIG. 9, respectively, although the embodiments described with FIG. 1 to FIG. 3 and following, may also be used to form encoders and decoders not operating according to the coding framework underlying the encoder and decoder of FIG. 8 and FIG. 9.

Figure 8:
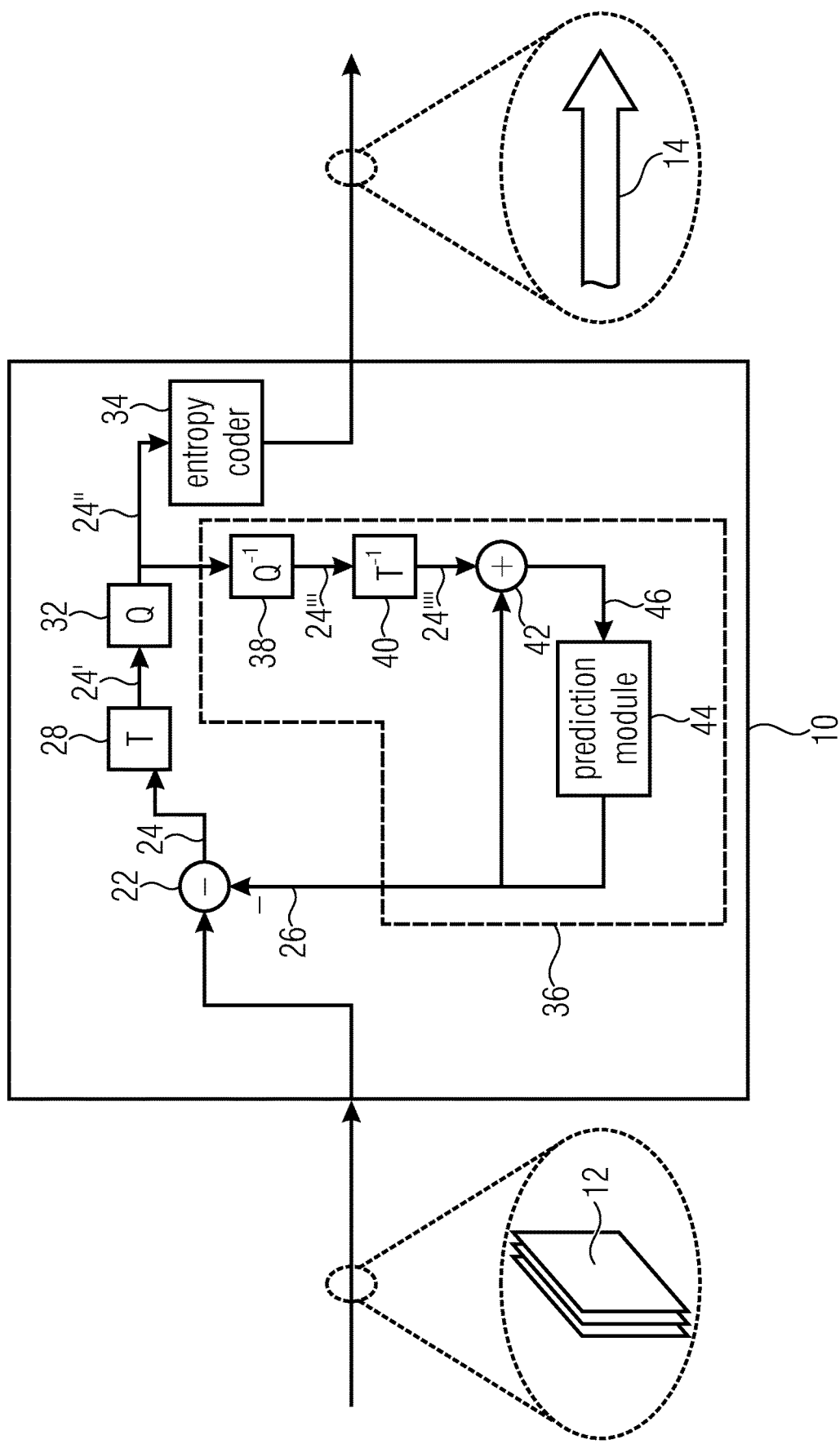
FIG. 8 illustrates a video encoder.
Figure 9:
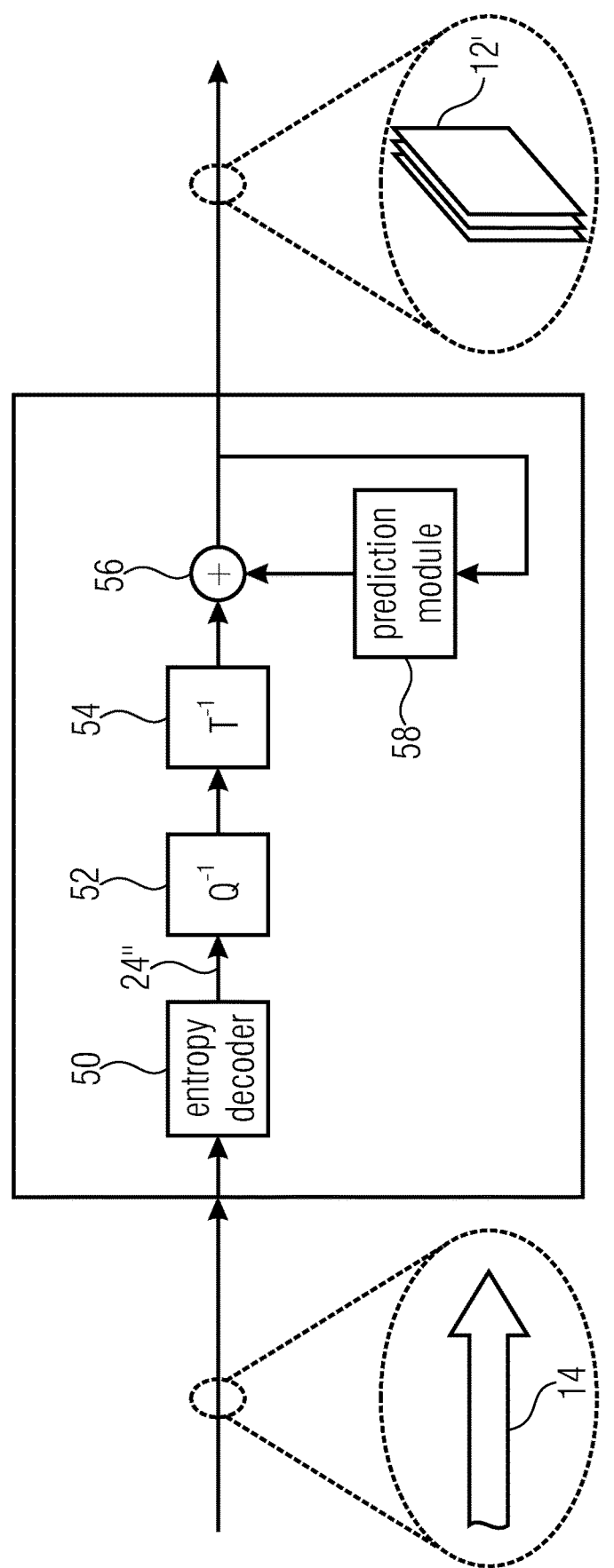
FIG. 9 illustrates a video decoder.

FIG. 8 shows a video encoder, an apparatus for predictively coding a picture 12 into a data stream 14 exemplarily using transform-based residual coding. The apparatus, or encoder, is indicated using reference sign 10. FIG. 9 shows a corresponding video decoder 20, e.g., an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 8 and FIG. 9 exemplarily use transform based prediction residual coding, although embodiments of the present application are not restricted to this kind of prediction residual coding. This is true for other details described with respect to FIG. 8 and FIG. 9, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, e.g., from the picture 12. The prediction residual signal former 22 may, for instance, be a subtractor which subtracts the prediction signal from the original signal, e.g., from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 8, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24'''' to an inverse transformation, e.g., a spectral-to-spatial transformation, to obtain prediction residual signal 24''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, e.g., a reconstruction of the original signal 12. Reconstructed signal 46 may correspond to signal 12'. A prediction module 44 of prediction stage 36 then generates the prediction signal 26 on the basis of signal 46 by using, for instance, spatial prediction, e.g., intra-picture prediction, and/or temporal prediction, e.g., inter-picture prediction.

Likewise, decoder 20, as shown in FIG. 9, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 9, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, e.g., coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 10:
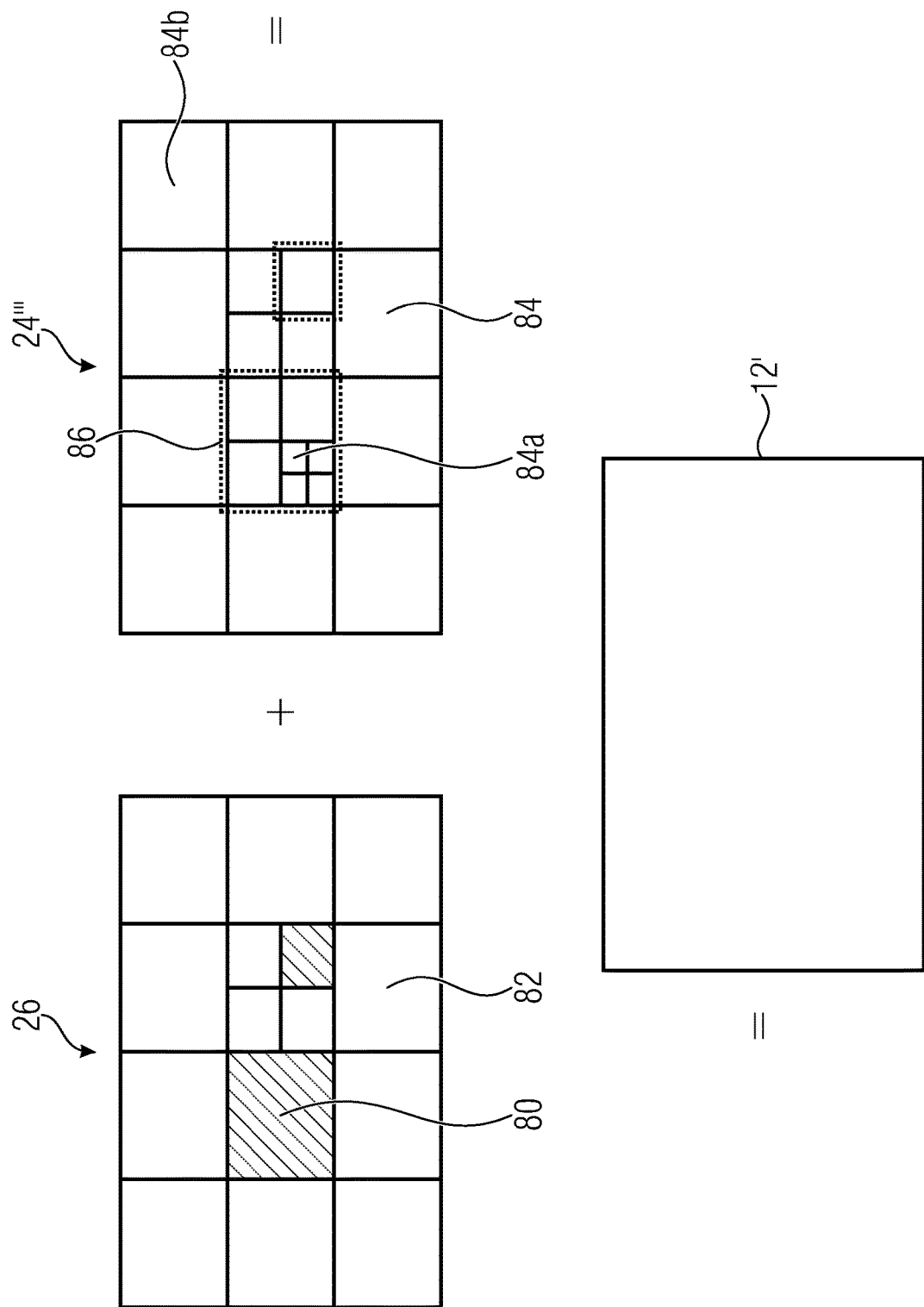
FIG. 10 illustrates the relationship between the reconstructed signal, e.g., the reconstructed picture, on the one hand, and the combination of the prediction residual signal as signaled in the data stream, and the prediction signal, on the other hand.

FIG. 10 illustrates the relationship between the reconstructed signal, e.g., the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 10 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 10 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 10 is also illustrated as a subdivision of the picture area into blocks 84. These blocks might be called transform blocks in order to distinguish same from the coding blocks 80 and 82. In effect, FIG. 10 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, e.g., each coding block 80 and 82, may concurrently form a transform block 84, but FIG. 10 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, e.g., the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 10 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 10, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:
  DCT-II (or DCT-III), where DCT stands for Discrete Cosine Transform
  DST-IV, where DST stands for Discrete Sine Transform
  DCT-IV
  DST-VII
  Identity Transformation (IT)

Naturally, while transformer 28 would support all of the forward transform versions of these transforms, the decoder 20 or inverse transformer 54 would support the corresponding backward or inverse versions thereof:
  Inverse DCT-II (or inverse DCT-III)
  Inverse DST-IV
  Inverse DCT-IV
  Inverse DST-VII
  Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 8 to FIG. 10 have been presented as an example where the inventive concept described further below may be implemented in order to form specific examples for encoders and decoders according to the present application. Insofar, the encoder and decoder of FIG. 8 and FIG. 9, respectively, may represent possible implementations of the encoders and decoders described herein below. FIG. 8 and FIG. 9 are, however, only examples. An encoder according to embodiments of the present application may, however, perform block-based encoding of a picture 12 using the concept outlined in more detail below and being different from the encoder of FIG. 8 such as, for instance, in that same is no video encoder, but a still picture encoder, in that same does not support inter-prediction, or in that the sub-division into blocks 80 is performed in a manner different than exemplified in FIG. 10. Likewise, decoders according to embodiments of the present application may perform block-based decoding of picture 12' from data stream 14 using the coding concept further outlined below, but may differ, for instance, from the decoder 20 of FIG. 9 in that same is no video decoder, but a still picture decoder, in that same does not support intra-prediction, or in that same sub-divides picture 12' into blocks in a manner different than described with respect to FIG. 10 and/or in that same does not derive the prediction residual from the data stream 14 in transform domain, but in spatial domain, for instance.

Figure 1:
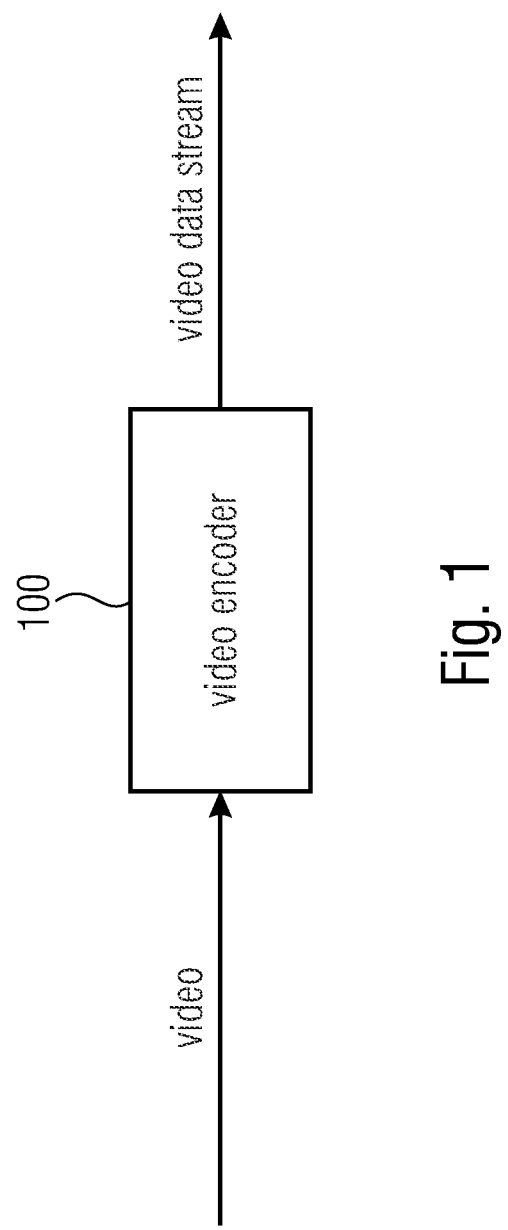
FIG. 1 illustrates a video encoder for encoding a video into a video data stream according to an embodiment.

FIG. 1 illustrates a video encoder 100 for encoding a video into a video data stream according to an embodiment. The video encoder 100 is configured to generate the video data stream such that the video data stream comprises an indication that indicates whether a picture of the video preceding a dependent random access picture shall be output or not.

Figure 2:
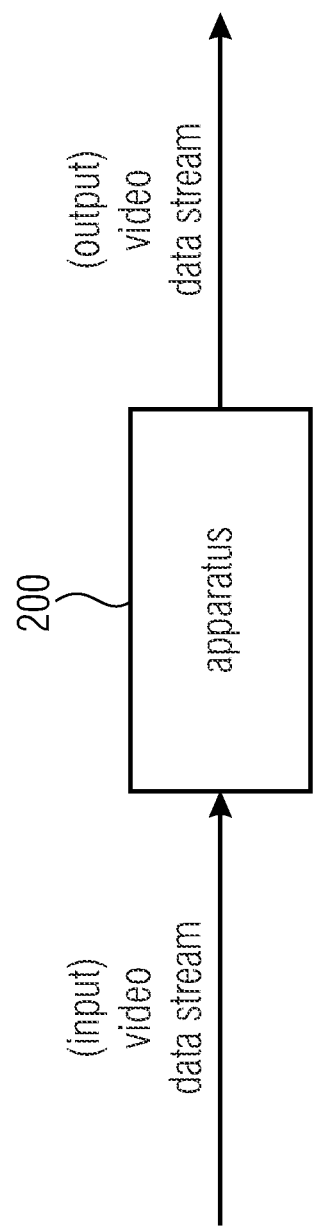
FIG. 2 illustrates an apparatus for receiving an input video data stream according to an embodiment.

FIG. 2 illustrates an apparatus 200 for receiving an input video data stream according to an embodiment. The input video data stream has a video encoded thereinto. The apparatus 200 is configured to generate an output video data stream from the input video data stream.

Figure 3:
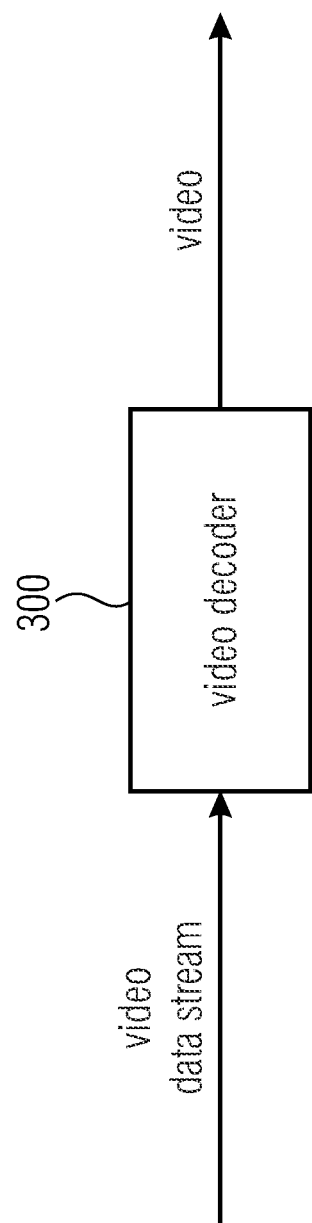
FIG. 3 illustrates a video decoder for receiving a video data stream having a video stored therein according to an embodiment.

FIG. 3 illustrates a video decoder 300 for receiving a video data stream having a video stored therein according to an embodiment. The video decoder 300 is configured to decode the video from the video data stream. The video decoder 300 is configured to decode the video depending on an indication indicating whether a picture of the video preceding a dependent random access picture shall be output or not.

Moreover, a system according to an embodiment is provided. The system comprises the apparatus of FIG. 2 and the video decoder of FIG. 3. The video decoder 300 of FIG. 3 is configured to receive the output video data stream of the apparatus of FIG. 2. The video decoder 300 of FIG. 3 is configured to decode the video from the output video data stream of the apparatus 200 of FIG. 2.

In an embodiment, the system may, e.g., further comprise a video encoder 100 of FIG. 1. The apparatus 200 of FIG. 2 may, e.g., be configured to receive the video data stream from the video encoder 100 of FIG. 1 as the input video data stream.

The (optional) intermediate device 210 of the apparatus 200 may, e.g., be configured to receive the video data stream from the video encoder 100 as an input video data stream and to generate an output video data stream from the input video data stream. For example, the intermediate device may, e.g., be configured to modify (header/meta data) information of the input video data stream and/or may, e.g., be configured to delete pictures from the input video data stream and/or may configured to mix/splice the input video data stream with an additional second bitstream having a second video encoded thereinto.

The (optional) video decoder 221 may, e.g., be configured to decode the video from the output video data stream.

The (optional) Hypothetical Reference Decoder 222 may, e.g., be configured to determine timing information for the video depending on the output video data stream, or may, e.g., be configured to determine buffer information for a buffer into which the video or a portion of the video is to be stored.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

A first aspect of the invention is described according to one or more embodiments.

A second aspect of the invention is described according to one or more embodiments.

A third aspect of the invention is described according to one or more embodiments.

A fourth aspect of the invention is described according to one or more embodiments.

A fifth aspect of the invention is described according to one or more embodiments.

In the following, the first aspect of the invention is now described in detail.

In accordance with the first aspect of the invention, an apparatus 200 for receiving an input video data stream is provided. The input video data stream has a video encoded thereinto. The apparatus 200 is configured to generate an output video data stream from the input video data stream. Moreover, the apparatus 200 is to determine whether a picture of the video preceding a dependent random access picture shall be output or not.

According to an embodiment, the apparatus 200 may, e.g., be configured to determine a first variable (e.g., a NoOutputBeforeDrapFlag) indicating whether the picture of the video that precedes the dependent random access picture shall be output or not.

In an embodiment, the apparatus 200 may, e.g., be configured to generate the output video data stream such that the output video data stream may, e.g., comprise an indication that may, e.g., indicate whether the picture of the video preceding the dependent random access picture shall be output or not.

According to an embodiment, the apparatus 200 may, e.g., be configured to generate the output video data stream such that the output video data stream may, e.g., comprise supplemental enhancement information comprising the indication that may, e.g., indicate whether the picture of the video preceding the dependent random access picture shall be output or not.

In an embodiment, the picture of the video that precedes the dependent random access picture may, e.g., be an independent random access picture. The apparatus 200 may, e.g., be configured to generate the output video data stream such that the output video data stream may, e.g., comprise a flag (e.g., a ph_pic_output_flag) having a predefined value (e.g., 0) in a picture header of the independent random access picture, such that the predefined value (e.g., 0) of the flag (e.g., a ph_pic_output_flag) may, e.g., indicate for the independent random access picture directly precedes said dependent random access picture within the video data stream, and that said independent random access picture shall not be output.

According to an embodiment, the flag may, e.g., be a first flag, wherein the apparatus 200 may, e.g., be configured to generate the output video data stream such that the output video data stream may, e.g., comprise a further flag in a picture parameter set of the video data stream, wherein the further flag may, e.g., indicate whether or not the first flag (e.g., a ph_pic_output_flag) exists in the picture header of the independent random access picture.

In an embodiment, the apparatus 200 may, e.g., be configured to generate the output video data stream such that the output video data stream may, e.g., comprise as the indication that may, e.g., indicate whether the picture of the video preceding the dependent random access picture shall be output or not a supplemental enhancement information flag within a supplemental enhancement information of the output video data stream, or a picture parameter set flag within a picture parameter set of the output video data stream, or a sequence parameter set flag within a sequence parameter set of the output video data stream, or an external means flag, wherein a value of the external means flag may, e.g., be set by an external unit being external to the apparatus 200.

According to an embodiment, the apparatus 200 may, e.g., be configured to determine a value of a second variable (e.g., a PictureOutputFlag) for the picture of the video that precedes the dependent random access picture depending on the first variable (e.g., a NoOutputBeforeDrapFlag), wherein the second variable (e.g., a PictureOutputFlag) may, e.g., indicate for said picture whether said picture shall be output or not, and wherein the apparatus 200 may, e.g., be configured to output or to not output said picture depending on the second variable (e.g., a PictureOutputFlag).

In an embodiment, the picture of the video that precedes the dependent random access picture may, e.g., be an independent random access picture. The first variable (e.g., a NoOutputBeforeDrapFlag) may, e.g., indicate that the independent random access picture shall not be output.

According to an embodiment, the picture of the video that precedes the dependent random access picture may, e.g., be an independent random access picture. The apparatus 200 may, e.g., be configured to set the first variable (e.g., a NoOutputBeforeDrapFlag) such that the first variable (e.g., a NoOutputBeforeDrapFlag) may, e.g., indicate that the independent random access picture shall be output.

In an embodiment, the apparatus 200 may, e.g., be configured to signal to a video decoder 300, whether a picture of the video preceding a dependent random access picture shall be output or not.

Moreover, a video data stream is provided. The video data stream has a video encoded thereinto. The video data stream comprises an indication that indicates whether a picture of the video preceding a dependent random access picture shall be output or not.

According to an embodiment, the video data stream may, e.g., comprise supplemental enhancement information comprising the indication that may, e.g., indicate whether the picture of the video preceding the dependent random access picture shall be output or not.

In an embodiment, the picture of the video that precedes the dependent random access picture may, e.g., be an independent random access picture. The video data stream may, e.g., comprise a flag (e.g., a ph_pic_output_flag) having a predefined value (e.g., 0) in a picture header of the independent random access picture, such that the predefined value (e.g., 0) of the flag (e.g., a ph_pic_output_flag) may, e.g., indicate for the independent random access picture directly precedes said dependent random access picture within the video data stream, and that said independent random access picture shall not be output.

According to an embodiment, the flag may, e.g., be a first flag, wherein the video data stream may, e.g., comprise a further flag in a picture parameter set of the video data stream, wherein the further flag may, e.g., indicate whether or not the first flag (e.g., a ph_pic_output_flag) exists in the picture header of the independent random access picture.

In an embodiment, the video data stream may, e.g., comprise as the indication that may, e.g., indicate whether the picture of the video preceding the dependent random access picture shall be output or not a supplemental enhancement information flag within a supplemental enhancement information of the output video data stream, or a picture parameter set flag within a picture parameter set of the output video data stream, or a sequence parameter set flag within a sequence parameter set of the output video data stream, or an external means flag, wherein a value of the external means flag may, e.g., be set by an external unit being external to an apparatus 200.

Furthermore, a video encoder 100 is provided. The video encoder 100 may, e.g., be configured to encode a video into a video data stream. Moreover, the video encoder 100 may, e.g., be configured to generate the video data stream such that the video data stream comprises an indication that indicates whether a picture of the video preceding a dependent random access picture shall be output or not.

According to an embodiment, the video encoder 100 may, e.g., be configured to generate the video data stream such that the video data stream may, e.g., comprise supplemental enhancement information comprising the indication that may, e.g., indicate whether the picture of the video preceding the dependent random access picture shall be output or not.

In an embodiment, the picture of the video that precedes the dependent random access picture may, e.g., be an independent random access picture. The video encoder 100 may, e.g., be configured to generate the video data stream such that the video data stream may, e.g., comprise a flag (e.g., a ph_pic_output_flag) having a predefined value (e.g., 0) in a picture header of the independent random access picture, such that the predefined value (e.g., 0) of the flag (e.g., a ph_pic_output_flag) may, e.g., indicate for the independent random access picture directly precedes said dependent random access picture within the video data stream, and that said independent random access picture shall not be output.

According to an embodiment, the flag may, e.g., be a first flag, wherein the video encoder 100 may, e.g., be configured to generate the video data stream such that the video data stream may, e.g., comprise a further flag in a picture parameter set of the video data stream, wherein the further flag may, e.g., indicate whether or not the first flag (e.g., a ph_pic_output_flag) exists in the picture header of the independent random access picture.

In an embodiment, the video encoder 100 may, e.g., be configured to generate the video data stream such that the video data stream may, e.g., comprise as the indication that may, e.g., indicate whether the picture of the video preceding the dependent random access picture shall be output or not a supplemental enhancement information flag within a supplemental enhancement information of the output video data stream, or a picture parameter set flag within a picture parameter set of the output video data stream, or a sequence parameter set flag within a sequence parameter set of the output video data stream, or an external means flag, wherein a value of the external means flag may, e.g., be set by an external unit being external to an apparatus 200.

Moreover, a video decoder 300 for receiving a video data stream having a video stored therein is provided. The video decoder 300 is configured to decode the video from the video data stream. The video decoder 300 is configured to decode the video depending on an indication indicating whether a picture of the video preceding a dependent random access picture shall be output or not.

According to an embodiment, the video decoder 300 may, e.g., be configured to decode the video depending on a first variable (e.g., a NoOutputBeforeDrapFlag) indicating whether the picture of the video that precedes the dependent random access picture shall be output or not.

In an embodiment, the video data stream may, e.g., comprise the indication that may, e.g., indicate whether the picture of the video preceding the dependent random access picture shall be output or not. The video decoder 300 may, e.g., be configured to decode the video depending on the indication within the video data stream.

According to an embodiment, the video data stream may, e.g., comprise supplemental enhancement information comprising the indication that may, e.g., indicate whether the picture of the video preceding the dependent random access picture shall be output or not.

The video decoder 300 may, e.g., be configured to decode the video depending on the supplemental enhancement information.

In an embodiment, the picture of the video that precedes the dependent random access picture may, e.g., be an independent random access picture. The video data stream may, e.g., comprise a flag (e.g., a ph_pic_output_flag) having a predefined value (e.g., 0) in a picture header of the independent random access picture, such that the predefined value (e.g., 0) of the flag (e.g., a ph_pic_output_flag) may, e.g., indicate for the independent random access picture directly precedes said dependent random access picture within the video data stream, and that said independent random access picture shall not be output. The video decoder 300 may, e.g., be configured to decode the video depending on the flag.

According to an embodiment, the flag may, e.g., be a first flag, wherein the video data stream may, e.g., comprise a further flag in a picture parameter set of the video data stream, wherein the further flag may, e.g., indicate whether or not the first flag (e.g., a ph_pic_output_flag) exists in the picture header of the independent random access picture. The video decoder 300 may, e.g., be configured to decode the video depending on the further flag.

In an embodiment, the video data stream may, e.g., comprise as the indication that may, e.g., indicate whether the picture of the video preceding the dependent random access picture shall be output or not a supplemental enhancement information flag within a supplemental enhancement information of the output video data stream, or a picture parameter set flag within a picture parameter set of the output video data stream, or a sequence parameter set flag within a sequence parameter set of the output video data stream, or an external means flag, wherein a value of the external means flag may, e.g., be set by an external unit being external to an apparatus 200. The video decoder 300 may, e.g., be configured to decode the video depending on the indication within the video data stream.

According to an embodiment, the video decoder 300 may, e.g., be configured to reconstruct the video from the video data stream. The video decoder 300 may, e.g., be configured to output or to not output the picture of the video that precedes the dependent random access picture depending on the first variable (e.g., a NoOutputBeforeDrapFlag).

In an embodiment, the video decoder 300 may, e.g., be configured to determine a value of a second variable (e.g., a PictureOutputFlag) for the picture of the video that precedes the dependent random access picture depending on the first variable (e.g., a NoOutputBeforeDrapFlag), wherein the second variable (e.g., a PictureOutputFlag) may, e.g., indicate for said picture whether said picture shall be output or not, and wherein the apparatus 200 may, e.g., be configured to output or to not output said picture depending on the second variable (e.g., a PictureOutputFlag).

According to an embodiment, the picture of the video that precedes the dependent random access picture may, e.g., be an independent random access picture. The video decoder 300 may, e.g., be configured to decode the video depending on the first variable (e.g., a NoOutputBeforeDrapFlag) which may, e.g., indicate that the independent random access picture shall not be output.

In an embodiment, the picture of the video that precedes the dependent random access picture may, e.g., be an independent random access picture. The video decoder 300 may, e.g., be configured to decode the video depending on the first variable (e.g., a NoOutputBeforeDrapFlag) which may, e.g., indicate that the independent random access picture shall be output.

Furthermore, a system is provided. The system comprises an apparatus 200 as described above and a video decoder 300 as described above. The video decoder 300 is configured to receive the output video data stream of the apparatus 200. Moreover, the video decoder 300 is configured to decode the video from the output video data stream of the apparatus 200.

According to an embodiment, the system may, e.g., further comprise a video encoder 100. The apparatus 200 may, e.g., be configured to receive the video data stream from the video encoder 100 as the input video data stream.

In particular, the first aspect of the invention relates to CVS start at DRAP and to omit IDR output in decoding and conformance testing.

When a bitstream comprises pictures marked as DRAP (i.e. only using the previous IRAP as reference for the DRAP and from there on in the bitstream) it is possible to utilize these DRAP pictures for random access functionality at lower rate overhead. However, when using some target DRAP for random accessing a stream, it is undesirable to display any initial picture before the target DRAP (i.e. the associated IRAP of target DRAP) at the decoder output as the temporal distance between these pictures would lead to a shacky/jittery video playback when played back at the rate of the original video until the video is played back in a smooth way from the target DRAP on.

Therefore, it is desirable to omit the output of the pictures preceding the DRAP picture. This aspect of the invention presents means to control the decoder accordingly.

In one embodiment, an external means to set the PicOutputFlag variable of an IRAP picture is made available for implementations to use as follows:
If some external means not specified in this Specification is available to set the variable NoOutputBeforeDrapFlag for the picture to a value, NoOutputBeforeDrapFlag for the picture is set equal to the value provided by the external means.

[ . . . ]

The variable PictureOutputFlag of the current picture is derived as follows:
If sps_video_parameter_set_id is greater than 0 and the current layer is not an output layer (i.e., nuh_layer_id is not equal to OutputLayerIdInOls[TargetOlsIdx][i] for any value of i in the range of 0 to NumOutputLayersInOls[TargetOlsIdx]−1, inclusive), or one of the following conditions is true, PictureOutputFlag is set equal to 0:
The current picture is a RASL picture and NoOutputBeforeRecoveryFlag of the associated IRAP picture is equal to 1.
The current picture is a GDR picture with NoOutputBeforeRecoveryFlag equal to 1 or is a recovering picture of a GDR picture with NoOutputBeforeRecoveryFlag equal to 1.
The current picture is a IRAP picture with NoOutputBeforeDrapFlag equal to 1.
Otherwise, PictureOutputFlag is set equal to ph_pic_output_flag.

In another embodiment, the NoOutputBeforeDrapFlag is set by external means only for the first IRAP picture in a CVS, and set to 0 otherwise.
If some external means not specified in this Specification is available to set the variable NoOutputBeforeDrapFlag for the picture to a value, NoOutputBeforeDrapFlag for the first picture in the CVS is set equal to the value provided by the external means. Otherwise, NoOutputBeforeDrapFlag is set to 0.

The above mentioned flag NoOutputBeforeDrapFlag could also be associated with the usage of alternative HRD timings conveyed in the bitstream for the case of removal of pictures between the IRAP picture and the DRAP picture, e.g. a the flag UseAltCpbParamsFlag in the VVC specification.

In an alternative embodiment, it is a constraint that IRAP pictures that directly precede DRAP pictures without non-DRAP pictures in between shall have a value of 0 in the output flag ph_pic_output_flag in the picture header. In this case, whenever an extractor or player uses a DRAP for random accessing, i.e. it removes intermediate pictures between IRAP and DRAP from the bitstream, it is also required to verify or adjust that the respective output flag is set to 0 and output of the IRAP is omitted.

For this operation to be simple the original bitstream needs to be prepared correspondingly. More concretely, pps_output_flag_present_flag, which determines the presence of the flag ph_pic_output_flag in the picture header shall be equal to 1 so that the picture header can be easily change and it is not required to change also parameter sets. That is:

It is a requirement of bitstream conformance that the value of pps_output_flag_present_flag shall be equal to 1 if the PPS is referred to by a picture within a CVSS AU that has associated DRAP AUs.

In addition to the options listed above, in another embodiment, it is indicated in a parameter set PPS or an SPS whether the first AU in the bitstream, i.e. a CRA or IDR that constitutes a CLVS start, is to be output or not after decoding. Thus, the system integration is simpler, as only a parameter set needs to be adjusted instead of requiring comparatively low-level syntax such as a PHs also to be changed, e.g. when parsing a file in file format ISOBMFF.

An example is shown in the following:

|  | Descriptor |
|---|---|
| seq_parameter_set_rbsp( ) { | |
| [...] | |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_pic_in_cvss_au_no_output_flag | u(1) |
| sps_log2_ctu_size_minus5 | u(2) |
| [...] | |
| } | | sps_pic_in_cvss_au_no_output_flag equal to 1 specifies that a picture in a CVSS AU referring to the SPS is not output. sps_pic_in_cvss_au_no_output_flag equal to 0 specifies that a picture in a CVSS AU referring to the SPS may or may not be output.

It is a requirement of bitstream conformance that the value of sps_pic_in_cvss_au_no_output_flag shall be the same for any SPS referred to by any output layer in an OLS. In 8.1.2

The variable PictureOutputFlag of the current picture is derived as follows:
  If sps_video_parameter_set_id is greater than 0 and the current layer is not an output layer (i.e., nuh_layer_id is not equal to OutputLayerIdInOls[TargetOlsIdx][i] for any value of i in the range of 0 to NumOutputLayersInOls[TargetOlsIdx]−1, inclusive), or one of the following conditions is true, PictureOutputFlag is set equal to 0:
    The current picture is a RASL picture and NoOutputBeforeRecoveryFlag of the associated IRAP picture is equal to 1.
    The current picture is a GDR picture with NoOutputBeforeRecoveryFlag equal to 1 or is a recovering picture of a GDR picture with NoOutputBeforeRecoveryFlag equal to 1.
  Otherwise, if the current AU is a CVSS AU and sps_pic_in_cvss_au_no_output_flag equal to 1 PictureOutputFlag is set equal to 0.
  Otherwise, PictureOutputFlag is set equal to ph_pic_output_flag.
    NOTE—In an implementation, the decoder could output a picture not belonging to an output layer. For example, when there is only one output layer while in an AU the picture of the output layer is not available, e.g., due to a loss or layer downswitching, the decoder could set PictureOutputFlag set equal to 1 for the picture that has the highest value of nuh_layer_id among all pictures of the AU available to the decoder and having ph_pic_output_flag equal to 1, and set PictureOutputFlag equal to 0 for all other pictures of the AU available to the decoder.

In another embodiment, for example, a requirement may, e.g., be defined as follows:
It is a requirement of bitstream conformance that the value of ph_pic_output_flag shall be equal to 0 if the a picture belongs to a IRAP AU and the IRAP AU is directly preceding a DRAP AU.

In the following, the second aspect of the invention is now described in detail.

In accordance with the second aspect of the invention, an apparatus 200 for receiving one or more input video data streams is provided. Each of the one or more input video data streams has an input video encoded thereinto. The apparatus 200 is configured to generate an output video data stream from the one or more input video data streams, the output video data stream encoding an output video, wherein the apparatus is configured to generate the output video data stream such that the output video is the input video being encoded within one of the one or more input video data streams, or such that the output video depends on the input video of at least one of the one or more input video data streams. Moreover, the apparatus 200 is configured to determine an access unit removal time of a current picture of a plurality of pictures of the output video from a coded picture buffer. The apparatus 200 is configured to determine whether or not to use coded picture buffer delay offset information for determining the access unit removal time of the current picture from the coded picture buffer.

According to an embodiment, the apparatus 200 may, e.g., be configured to drop a group of one or more pictures of the input video of a first video data stream of the one or more input video data streams to generate the output video data stream. The apparatus 200 may, e.g., be configured to determine an access unit removal time for at least one of the plurality of pictures of the output video from the coded picture buffer depending on the coded picture buffer delay offset information.

In an embodiment, the first video received by the apparatus 200 may, e.g., be a preprocessed video which results from an original video from which a group of one or more pictures has been dropped to generate the preprocessed video. The apparatus 200 may, e.g., be configured to determine an access unit removal time for at least one of the plurality of pictures of the output video from the coded picture buffer depending on the coded picture buffer delay offset information.

According to an embodiment, the buffer delay offset information depends on a number of pictures of the input video that have been dropped.

In an embodiment, the one or more input video data streams are two or more input video data streams. The apparatus 200 may, e.g., be configured to splice the processed video and the input video of a second video data stream of the two or more input video data streams to obtain the output video, and may, e.g., be configured to encode the output video into the output video data stream.

According to an embodiment, the apparatus 200 may, e.g., be configured to determine whether or not to use coded picture buffer delay offset information for determining the access unit removal time of the current picture depending on a location of the current picture within the output video. Or, the apparatus 200 may, e.g., be configured to determine whether or not to set a coded picture buffer delay offset value of the coded picture buffer delay offset information to 0 for determining the access unit removal time of the current picture depending on the location of the current picture within the output video.

In an embodiment, the apparatus 200 may, e.g., be configured to determine whether or not to use coded picture buffer delay offset information for determining the access unit removal time of the current picture depending on a position of a previous non-discardable picture which precedes the current picture within the output video.

According to an embodiment, the apparatus 200 may, e.g., be configured to determine whether or not to use coded picture buffer delay offset information for determining the access unit removal time of the current picture depending on whether or not the previous non-discardable picture which precedes the current picture within the output video may, e.g., be a first picture in a previous buffering period.

In an embodiment, the apparatus 200 may, e.g., be configured to determine whether or not to use coded picture buffer delay offset information for determining the access unit removal time of the current picture depending on a concatenation flag, the current picture being a first picture of the input video of the second video data stream.

According to an embodiment, the apparatus 200 may, e.g., be configured to determine the access unit removal time of the current picture depending on a removal time of a preceding picture.

In an embodiment, the apparatus 200 may, e.g., be configured to determine the access unit removal time of the current picture depending on initial coded picture buffer removal delay information.

According to an embodiment, the apparatus 200 may, e.g., be configured to update the initial coded picture buffer removal delay information depending on a clock tick to obtain temporary coded picture buffer removal delay information to determine the access unit removal time of the current picture.

According to an embodiment, if the concatenation flag is set to a first value, then the apparatus 200 is configured to use the coded picture buffer delay offset information to determine one or more removal times. If the concatenation flag is set to a second value being different from the first value then the apparatus 200 is configured to not use the coded picture buffer delay offset information to determine the one or more removal times.

In an embodiment, the apparatus 200 may, e.g., be configured to signal to a video decoder 300, whether or not to use coded picture buffer delay offset information for determining the access unit removal time of the current picture from the coded picture buffer.

According to an embodiment, the current picture may, e.g., be located at a splicing point of the output video, where two input videos have been spliced.

Furthermore, a video data stream is provided. The video data stream has a video encoded thereinto. The video data stream comprises coded picture buffer delay offset information.

According to an embodiment, the video data stream may, e.g., comprise a concatenation flag.

In an embodiment, the video data stream may, e.g., comprise initial coded picture buffer removal delay information.

According to an embodiment, if the concatenation flag is set to a first value (e.g., 0) then the concatenation flag indicates that the coded picture buffer delay offset information needs to be used to determine one or more (picture or access unit) removal times, e.g., when it is known that some pictures (e.g., RASL pictures) have been dropped. If the concatenation flag is set to a second value being different from the first value (e.g., 1) then the concatenation flag indicates that the indicated offset is not used to determine the one or more (picture or access unit) removal times, e.g., irrespective of an offset signaling and, e.g., irrespective of whether RASL pictures have been dropped. If pictures are not dropped, then, e.g., the offset is not to be used.

Moreover, a video encoder 100, is provided. The video encoder 100 is configured to encode a video into a video data stream. The video encoder 100 is configured to generate the video data stream such that the video data stream comprises coded picture buffer delay offset information.

According to an embodiment, the video encoder 100 may, e.g., be configured to generate the video data stream such that the video data stream may, e.g., comprise a concatenation flag.

In an embodiment, the video encoder 100 may, e.g., be configured to generate the video data stream such that the video data stream may, e.g., comprise coded picture buffer delay offset information.

Furthermore, a video decoder 300 for receiving a video data stream a video stored therein is provided. The video decoder 300 is configured to decode the video from the video data stream. Moreover, the video decoder 300 is configured to decode the video depending on an access unit removal time of a current picture of a plurality of pictures of the video from a coded picture buffer. The video decoder 300 is configured to decode the video depending on an indication indicating whether or not to use coded picture buffer delay offset information for determining the access unit removal time of the current picture from the coded picture buffer.

According to an embodiment, the access unit removal time for at least one of the plurality of pictures of the video from the coded picture buffer depends on the coded picture buffer delay offset information.

In an embodiment, the video decoder 300 is configured to decode the video depending on whether or not to use coded picture buffer delay offset information for determining the access unit removal time of the current picture depending on a location of the current picture within the video.

According to an embodiment, the video decoder 300 may, e.g., be configured to decode the video depending on whether or not a coded picture buffer delay offset value of the coded picture buffer delay offset information may, e.g., be set to 0.

In an embodiment, the video decoder 300 may, e.g., be configured to determine whether or not to use coded picture buffer delay offset information for determining the access unit removal time of the current picture depending on a position of a previous non-discardable picture which precedes the current picture within the video.

According to an embodiment, the video decoder 300 may, e.g., be configured to determine whether or not to use coded picture buffer delay offset information for determining the access unit removal time of the current picture depending on whether or not the previous non-discardable picture which precedes the current picture within the video may, e.g., be a first picture in a previous buffering period.

In an embodiment, the video decoder 300 may, e.g., be configured to determine whether or not to use coded picture buffer delay offset information for determining the access unit removal time of the current picture depending on a concatenation flag, the current picture being a first picture of the input video of the second video data stream.

According to an embodiment, the video decoder 300 may, e.g., be configured to determine the access unit removal time of the current picture depending on a removal time of a preceding picture.

In an embodiment, the video decoder 300 may, e.g., be configured to determine the access unit removal time of the current picture depending on initial coded picture buffer removal delay information.

According to an embodiment, the video decoder 300 may, e.g., be configured to update the initial coded picture buffer removal delay information depending on a clock tick to obtain temporary coded picture buffer removal delay information to determine the access unit removal time of the current picture.

According to an embodiment, if the concatenation flag is set to a first value, then the video decoder 300 is configured to use the coded picture buffer delay offset information to determine one or more removal times. If the concatenation flag is set to a second value being different from the first value then the video decoder 300 is configured to not use the coded picture buffer delay offset information to determine the one or more removal times.

Furthermore, a system is provided. The system comprises an apparatus 200 as described above and a video decoder 300 as described above. The video decoder 300 is configured to receive the output video data stream of the apparatus 200. Moreover, the video decoder 300 is configured to decode the video from the output video data stream of the apparatus 200.

According to an embodiment, the system may, e.g., further comprise a video encoder 100. The apparatus 200 may, e.g., be configured to receive the video data stream from the video encoder 100 as the input video data stream.

In particular, the second aspect of the invention relates to that prevNonDiscardable in case of alternative timing may (when it is not a BP start) already include the alternative offset (CpbDelayOffset), so for the AU with concatenation_flag==1, CpbDelayOffset should be temporally set to zero.

When splicing of two bitstreams happens the derivation of the removal time of an AU from the CPB is done differently than for non-spliced bitstreams. At the splicing point a Buffering Period SEI message (BP SEI message; SEI=supplemental enhancement information) comprises a concatenationFlag being equal to 1. Then the decoder needs to check among 2 values and take the bigger one of both:
  previous Non Discardable Pic (prevNonDiscardablePic) removal time plus a delta signalled in the BP SEI message (auCpbRemovalDelayDeltaMinus1+1), or
  preceding Pic removal time plus InitCpbRemovalDelay However, when the previous Pic with a BP SEI message was an AU for which alternative timings have been used (i.e. a second timing information used when the RASL picture or pictures up to a DRAP have been dropped) for derivation of the removal times, an offset is used (CpbDelayOffset) to compute each removal time that computed as a delta to the previous pic with a buffering period, i.e. AuNominalRemovalTime[firstPicInPrevBuffPeriod] plus AuCpbRemovalDelayVal−CpbDelayOffset, as illustrated in FIG. 4.

Figure 4:
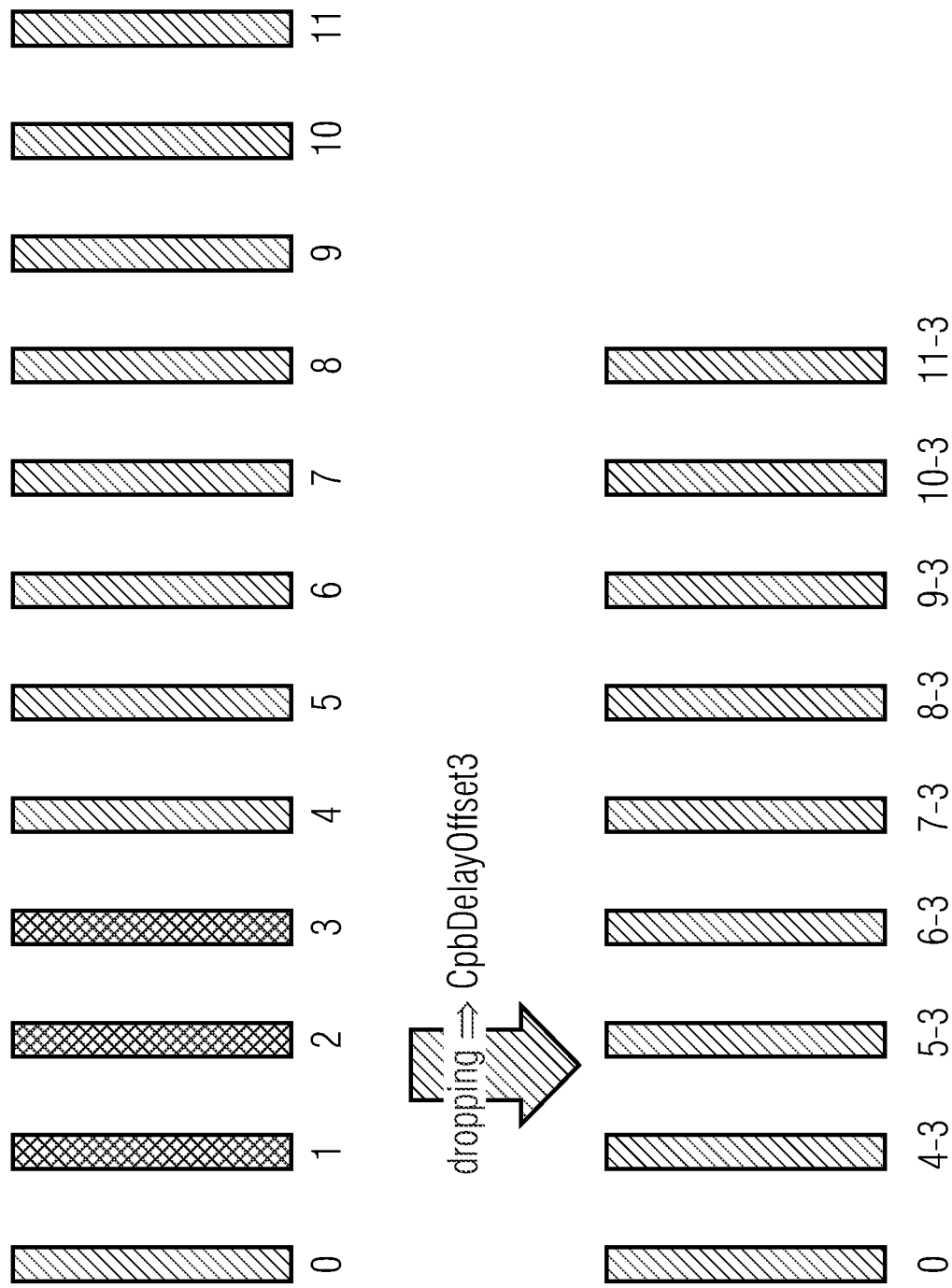
FIG. 4 illustrates an original bitstream (depicted at the top of FIG. 4), and a bitstream after dropping pictures (depicted at the bottom of FIG. 4) according to an embodiment.

FIG. 4 illustrates an original bitstream (top of FIG. 4), and a bitstream after dropping pictures (bottom of FIG. 4): An offset is incorporated into a calculation of the removal delay after dropping AUs (lines 1, 2 and 3 in the original bitstream).

The offset is added since the removal time is computed using a delta to the removal time of the picture referred to as firstPicInPrevBuffPeriod, after which some AUs have been dropped and therefore a CpbDelayOffset is necessary to account (compensate) for the AU dropping.

Figure 5:
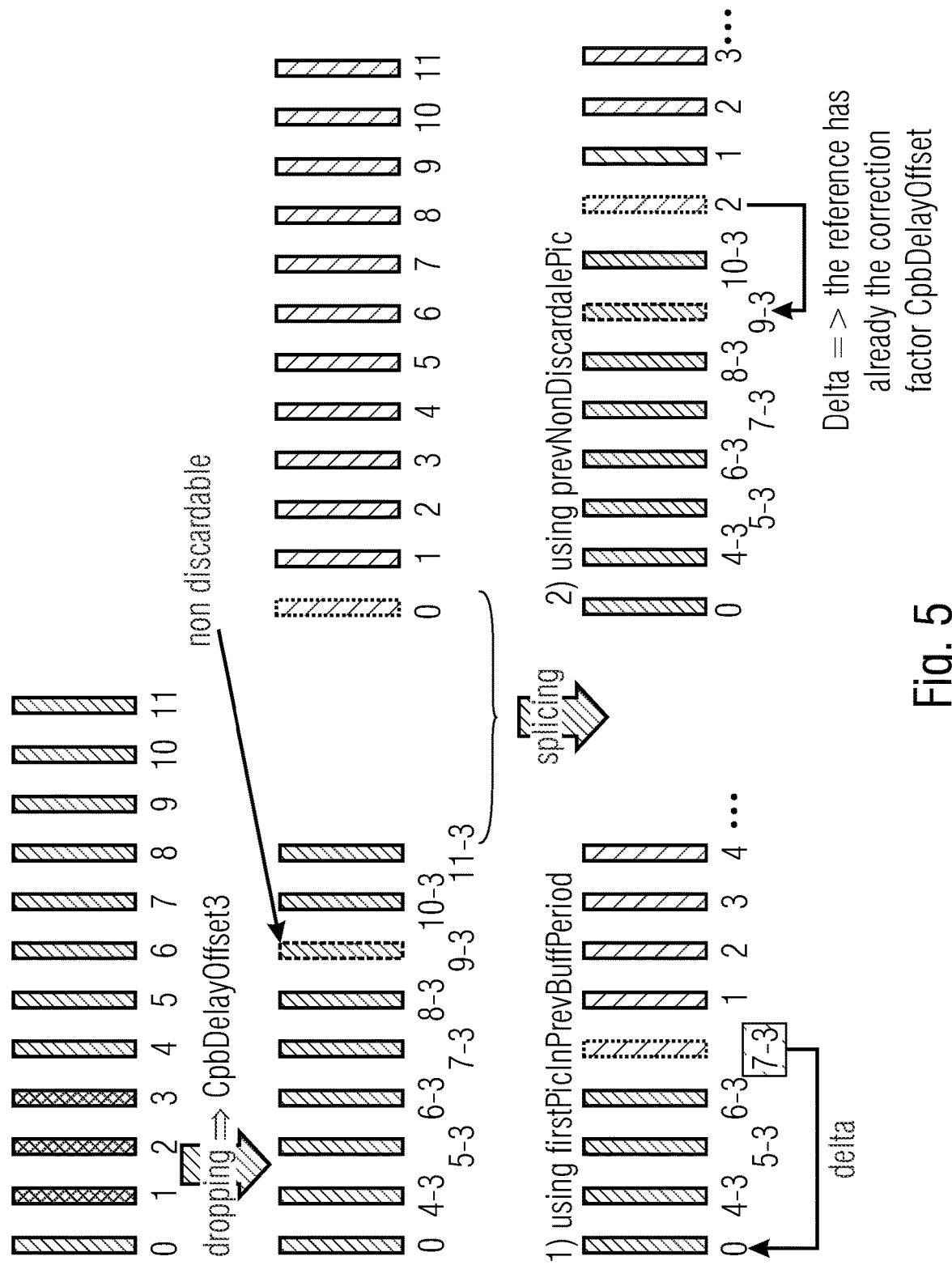
FIG. 5 illustrates a splicing of two bitstreams after pictures have been dropped from the one of the two bitstreams according to an embodiment.

FIG. 5 illustrates the splicing of two bitstreams (at a different position), a first bitstream (in FIG. 5 middle left) and a second bitstream (in FIG. 5, middle, right), after pictures were dropped from the original first bitstream (in FIG. 5, middle, left).

The example for using the preceding Pic removal time as anchor instead of the previous non-discardable picture is similar and would not require the "−3" correction factor (CpbDelayOffset) neither.

However, in the splicing case as illustrated in FIG. 5, note that it is not necessarily the case that the two derivations use the removal time of the AU associated with a BP SEI message (firstPicInPrevBuffPeriod). As discussed, for the splicing case a delta added to either the prevNonDiscardablePic or just the preceding Pic. This means that when the prevNonDiscardablePic is not the firstPicInPrevBuffPeriod, the CpbDelayOffset cannot be used to derive the removal time from the CPB of the current AU, as the removal time of prevNonDiscardablePic already accounts for AU dropping and no AUs are dropped between prevNonDiscardablePic and the AU for which the removal time is computed. Now imagine that the preceding Pic removal time is used instead, as for the case that the current AU (i.e. the splicing point with a new BP SEI message) has an InitialCpbRemovalDelay that forces the removal time of the current AU to come after its desired removal time, which would have achieved an equidistant removal time (when the prevNonDiscardablePic is used instead). In such a case, the removal time of the current AU cannot be smaller than the time computed by using the preceding Pic removal time plus InitCpbRemovalDelay as this could lead to buffer underruns (AUs not in the buffer before they need to be removed). Therefore, as part of the invention, for this case the CpbDelayOffset is not used for the computation or considered to be equal to 0.

Summarizing the embodiment herein is to use a CpbDelayOffset for the computation of AU removal times when RASL AUs are dropped from a bitstream or AUs in between an IRAP and DRAP AUs are dropped depending on a check. The check to determine whether
  CpbDelayOffset is not used or considered to be equal to 0 being one of the following:
  prevNonDiscardablePic is not the firstPicInPrevBuffPeriod preceding Pic removal time plus InitCpbRemovalDelay is used for the computation of the removal of the current AU The implementation in the specification could be as follows:
  When AU n is the first AU of a BP that does not initialize the HRD, the following applies:
  The nominal removal time of the AU n from the CPB is specified by:

```
if( !concatenationFlag) {
    baseTime = AuNominalRemovalTime[ firstPicInPrevBuffPeriod ]
    tmpCpbRemovalDelay = AuCpbRemovalDelayVal
    tmpCpbDelayOffset = CpbDelayOffset
} else {
    baseTime1 = AuNominalRemovalTime[ prevNonDiscardablePic ]
    tmpCpbRemovalDelay1 =
      ( auCpbRemovalDelayDeltaMinus1 + 1 )
    baseTime2 = AuNominalRemovalTime[ n − 1 ]
    tmpCpbRemovalDelay2 =                                    (C.10)
        Ceil( ( InitCpbRemovalDelay[ Htid ][ ScIdx ] ÷ 90000 +
    AuFinalArrivalTime[ n − 1 ] −
    AuNominalRemovalTime[ n − 1 ] ) ÷ ClockTick )
    if( baseTime1 + ClockTick * tmpCpbRemovalDelay1 <
          baseTime2 + ClockTick * tmpCpbRemovalDelay2 ) {
      baseTime = baseTime2
      tmpCpbRemovalDelay = tmpCpbRemovalDelay2
```

```
    tmpCpbDelayOffset = 0
} else {
    baseTime = baseTime1
    tmpCpbRemovalDelay = tmpCpbRemovalDelay1
    tmpCpbDelayOffset = ((prevNonDiscardablePic=
=firstPicInPrevBuffPeriod)?CpbDelayOffset:0)
    }
}
AuNominalRemovalTime[ n ] =
baseTime + ( ClockTick * tmpCpbRemovalDelay −
tmpCpbDelayOffset
)
```

Figure 6:
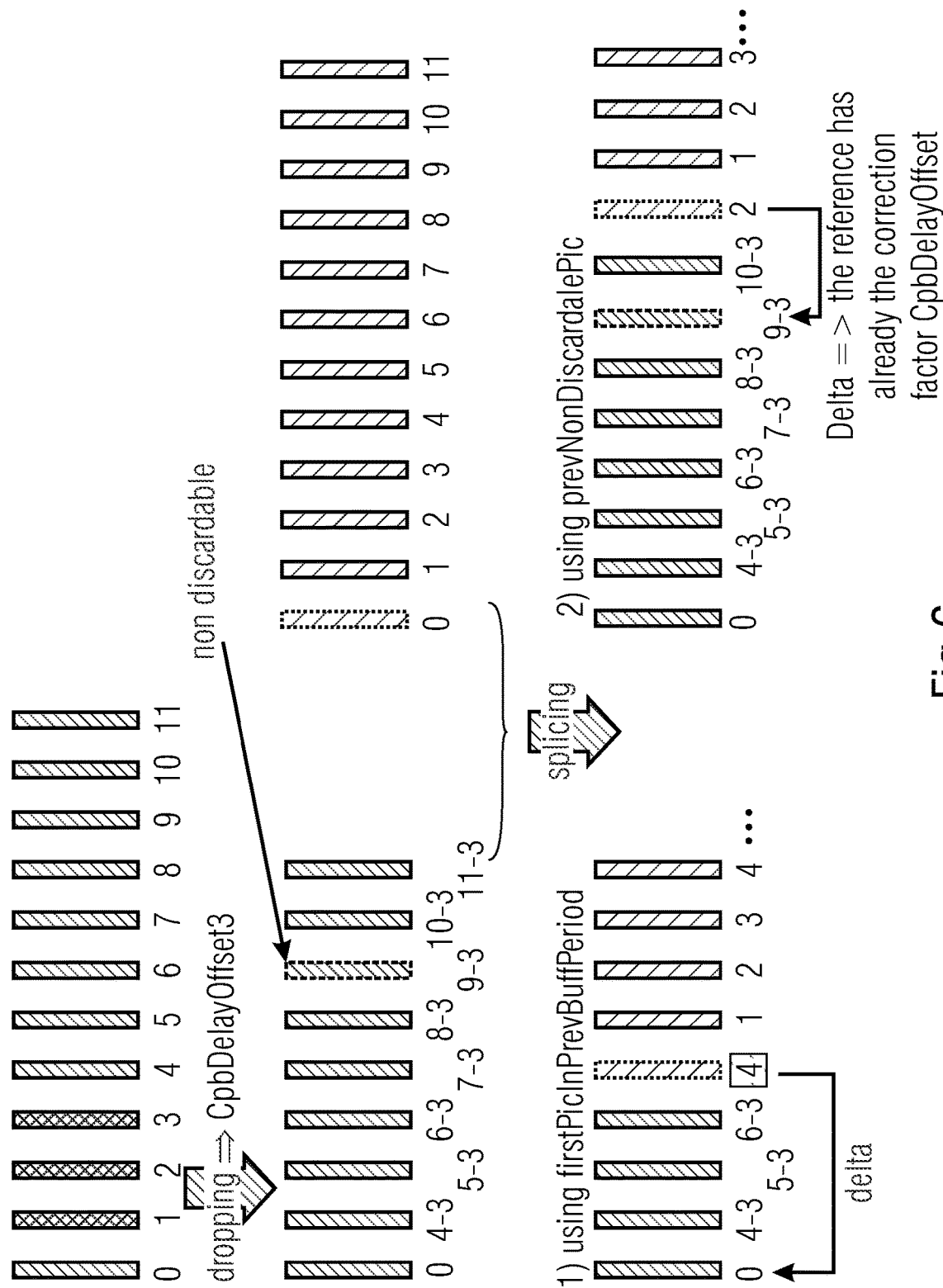
FIG. 6 illustrates a splicing of two bitstreams according to another embodiment.

Alternatively, in another embodiment illustrated in FIG. 6, the CpbDelayOffset for the computation of AU removal times when RASL AUs are dropped from a bitstream or AUs in between an IRAP and DRAP AUs are dropped depending on a different check that comprises checking the concatenationFlag.

In that case the delta in the bitstream when concatenationFlag is set to 1 needs to match the proper value as if the CpbDelayOffset was accounted for (as evident when comparing FIGS. 5 and 6), as for that figure CpbDelayOffset is not applied or considered to be 0.

The implementation in the specification could be as follows:

When AU n is the first AU of a BP that does not initialize the HRD, the following applies:
The nominal removal time of the AU n from the CPB is specified by:

```
if( !concatenationFlag ) {
    baseTime = AuNominalRemovalTime[ firstPicInPrevBuffPeriod ]
    tmpCpbRemovalDelay = AuCpbRemovalDelayVal
    tmpCpbDelayOffset = CpbDelayOffset
} else {
    baseTime1 = AuNominalRemovalTime[ prevNonDiscardablePic ]
    tmpCpbRemovalDelay1 =
    ( auCpbRemovalDelayDeltaMinus1 + 1 )
    baseTime2 = AuNominalRemovalTime[ n − 1 ]
    tmpCpbRemovalDelay2 =                                    (C.10)
        Ceil( ( InitCpbRemovalDelay[ Htid ][ ScIdx ] ÷ 90000 +
    AuFinalArrivalTime[ n − 1 ] −
    AuNominalRemovalTime[ n − 1 ] ) ÷ ClockTick )
    if( baseTime1 + ClockTick * tmpCpbRemovalDelay1 <
        baseTime2 + ClockTick * tmpCpbRemovalDelay2 ) {
        baseTime = baseTime2
        tmpCpbRemovalDelay = tmpCpbRemovalDelay2
    } else {
        baseTime = baseTime1
        tmpCpbRemovalDelay = tmpCpbRemovalDelay1
    }
    tmpCpbDelayOffset = 0
}
AuNominalRemovalTime[ n ] =
baseTime + ( ClockTick * tmpCpbRemovalDelay −
tmpCpbDelayOffset
```

In the following, the third aspect of the invention is now described in detail.

In accordance with the third aspect of the invention, a video data stream is provided. The video data stream has a video encoded thereinto. Moreover, the video data stream comprises an initial coded picture buffer removal delay. Furthermore, the video data stream comprises an initial coded picture buffer removal offset. Moreover, the video data stream comprises information that indicates whether or not a sum of the initial coded picture buffer removal delay and the initial coded picture buffer removal offset is defined to be constant across two or more buffering periods.

According to an embodiment, the initial coded picture buffer removal delay may, e.g., indicate a time that needs to pass for a first access unit of a picture of the video data stream that initializes a video decoder 300 before sending the first access unit to the video decoder 300.

In an embodiment, the video data stream may, e.g., comprise a single indication that may, e.g., indicate whether or not the sum of the initial coded picture buffer removal delay and the initial coded picture buffer removal offset may, e.g., be defined to be constant across the two or more buffering periods.

According to an embodiment, the video data stream may, e.g., comprise a concatenation flag as the single indication, that may, e.g., indicate whether or not the sum of the initial coded picture buffer removal delay and the initial coded picture buffer removal offset may, e.g., be defined to be constant across the two or more buffering periods. If the concatenation flag is equal to a first value, the sum of the initial coded picture buffer removal delay and the initial coded picture buffer removal offset is constant across the two or more buffering periods. If the concatenation flag is different from the first value, the concatenation flag does not define whether or not the sum of the initial coded picture buffer removal delay and the initial coded picture buffer removal offset is constant across the two or more buffering periods.

In an embodiment, if the single indication does not indicate that the sum of the initial coded picture buffer removal delay and the initial coded picture buffer removal offset is defined to be constant across the two or more buffering periods, the video data stream may, e.g., comprise continuously updated information on the initial coded picture buffer removal delay information and continuously updated information on the initial coded picture buffer removal offset information.

According to an embodiment, if the video data stream comprises the information that indicates that the sum of the initial coded picture buffer removal delay and the initial coded picture buffer removal offset is defined to be constant across the two or more buffering periods, the sum of the initial coded picture buffer removal delay and the initial coded picture buffer removal offset may, e.g., be defined to be constant starting from a current position within the video data stream.

Furthermore, a video encoder 100 is provided. The video encoder 100 is configured to encode a video into a video data stream. Moreover, the video encoder 100 is configured to generate the video data stream such that the video data stream comprises an initial coded picture buffer removal delay. Furthermore, the video encoder 100 is configured to generate the video data stream such that the video data stream comprises an initial coded picture buffer removal offset. Moreover, the video encoder 100 is configured to generate the video data stream such that the video data stream comprises information that indicates whether or not a sum of the initial coded picture buffer removal delay and the initial coded picture buffer removal offset is defined to be constant across two or more buffering periods.

According to an embodiment, the initial coded picture buffer removal delay may, e.g., indicate a time that needs to pass for a first access unit of a picture of the video data stream that initializes a video decoder 300 before sending the first access unit to the video decoder 300.

In an embodiment, the video encoder 100 may, e.g., be configured to generate the video data stream such that the video data stream may, e.g., comprise a single indication that may, e.g., indicate whether or not the sum of the initial coded picture buffer removal delay and the initial coded picture buffer removal offset may, e.g., be defined to be constant across the two or more buffering periods.

According to an embodiment, the video encoder 100 may, e.g., be configured to generate the video data stream such that the video data stream may, e.g., comprise a concatenation flag as the single indication, that may, e.g., indicate whether or not the sum of the initial coded picture buffer removal delay and the initial coded picture buffer removal offset may, e.g., be defined to be constant across the two or more buffering periods. If the concatenation flag is equal to a first value, the sum of the initial coded picture buffer removal delay and the initial coded picture buffer removal offset is constant across the two or more buffering periods. If the concatenation flag is different from the first value, the concatenation flag does not define whether or not the sum of the initial coded picture buffer removal delay and the initial coded picture buffer removal offset is constant across the two or more buffering periods.

In an embodiment, if the single indication does not indicate that the sum of the initial coded picture buffer removal delay and the initial coded picture buffer removal offset is defined to be constant across the two or more buffering periods, the video encoder 100 may, e.g., be configured to generate the video data stream such that the video data stream may, e.g., comprise continuously updated information on the initial coded picture buffer removal delay information and continuously updated information on the initial coded picture buffer removal offset information.

According to an embodiment, if the video data stream comprises the information that may, e.g., indicate that the sum of the initial coded picture buffer removal delay and the initial coded picture buffer removal offset is defined to be constant across the two or more buffering periods, the sum of the initial coded picture buffer removal delay and the initial coded picture buffer removal offset is defined to be constant starting from a current position within the video data stream.

Moreover, an apparatus 200 for receiving two input video data streams, being a first input video data stream and a second input video data stream, is provided. Each of the two input video data streams has an input video encoded thereinto. The apparatus 200 is configured to generate an output video data stream from the two input video data streams, the output video data stream encoding an output video, wherein the apparatus is configured to generate an output video data stream by concatenating the first input video data stream and the second input video data stream. Moreover, the apparatus 200 is configured to generate the output video data stream such that the output video data stream comprises an initial coded picture buffer removal delay. Furthermore, the apparatus 200 is configured to generate the output video data stream such that the output video data stream comprises an initial coded picture buffer removal offset. Moreover, the apparatus 200 is configured to generate the output video data stream such that the output video data stream comprises information that indicates whether or not a sum of the initial coded picture buffer removal delay and the initial coded picture buffer removal offset is defined to be constant across two or more buffering periods.

According to an embodiment, the initial coded picture buffer removal delay may, e.g., indicate a time that needs to pass for a first access unit of a picture of the output video data stream that initializes a video decoder 300 before sending the first access unit to the video decoder 300.

In an embodiment, the apparatus 200 may, e.g., be configured to generate the output video data stream such that the output video data stream may, e.g., comprise a single indication that may, e.g., indicate whether or not the sum of the initial coded picture buffer removal delay and the initial coded picture buffer removal offset may, e.g., be defined to be constant across the two or more buffering periods.

According to an embodiment, the apparatus 200 may, e.g., be configured to generate the output video data stream such that the output video data stream may, e.g., comprise a concatenation flag as the single indication, that may, e.g., indicate whether or not the sum of the initial coded picture buffer removal delay and the initial coded picture buffer removal offset may, e.g., be defined to be constant across the two or more buffering periods. If the concatenation flag is equal to a first value, the sum of the initial coded picture buffer removal delay and the initial coded picture buffer removal offset is constant across the two or more buffering periods. If the concatenation flag is different from the first value, the concatenation flag does not define whether or not the sum of the initial coded picture buffer removal delay and the initial coded picture buffer removal offset is constant across the two or more buffering periods.

In an embodiment, if the single indication does not indicate that the sum of the initial coded picture buffer removal delay and the initial coded picture buffer removal offset is defined to be constant across the two or more buffering periods, the apparatus 200 is configured to generate the output video data stream such that the output video data stream comprises continuously updated information on the initial coded picture buffer removal delay information and continuously updated information on the initial coded picture buffer removal offset information.

According to an embodiment, if the video data stream comprises the information that indicates that the sum of the initial coded picture buffer removal delay and the initial coded picture buffer removal offset is defined to be constant across the two or more buffering periods, the sum of the initial coded picture buffer removal delay and the initial coded picture buffer removal offset is defined to be constant starting from a current position within the video data stream.

Furthermore, a video decoder 300 for receiving a video data stream a video stored therein is provided. The video decoder 300 is configured to decode the video from the video data stream. Moreover, the video data stream comprises an initial coded picture buffer removal delay. Furthermore, the video data stream comprises an initial coded picture buffer removal offset. Moreover, the video data stream comprises information that indicates whether or not a sum of the initial coded picture buffer removal delay and the initial coded picture buffer removal offset is defined to be constant across two or more buffering periods. Furthermore, the video decoder 300 is configured to decode the video depending on the information that indicates whether or not the sum of the initial coded picture buffer removal delay and the initial coded picture buffer removal offset is defined to be constant across the two or more buffering periods.

According to an embodiment, the initial coded picture buffer removal delay may, e.g., indicate a time that needs to pass for a first access unit of a picture of the output video data stream that initializes the video decoder 300 before sending the first access unit to the video decoder 300.

In an embodiment, the video data stream may, e.g., comprise a single indication that may, e.g., indicate whether or not the sum of the initial coded picture buffer removal delay and the initial coded picture buffer removal offset may, e.g., be defined to be constant across the two or more buffering periods. The video decoder 300 may, e.g., be configured to decode the video depending on the single indication.

According to an embodiment, the video data stream may, e.g., comprise a concatenation flag as the single indication, that may, e.g., indicate whether or not the sum of the initial coded picture buffer removal delay and the initial coded picture buffer removal offset may, e.g., be defined to be constant across the two or more buffering periods. If the concatenation flag is equal to a first value, the sum of the initial coded picture buffer removal delay and the initial coded picture buffer removal offset is constant across the two or more buffering periods. If the concatenation flag is different from the first value, the concatenation flag does not define whether or not the sum of the initial coded picture buffer removal delay and the initial coded picture buffer removal offset is constant across the two or more buffering periods. The video decoder 300 is configured to decode the video depending on the concatenation flag.

In an embodiment, if the single indication does not indicate that the sum of the initial coded picture buffer removal delay and the initial coded picture buffer removal offset is defined to be constant across the two or more buffering periods, the video data stream comprises continuously updated information on the initial coded picture buffer removal delay information and continuously updated information on the initial coded picture buffer removal offset information. The video decoder 300 is configured to decode the video depending on the continuously updated information on the initial coded picture buffer removal delay information and on the continuously updated information on the initial coded picture buffer removal offset information.

According to an embodiment, if the video data stream comprises the information that indicates that the sum of the initial coded picture buffer removal delay and the initial coded picture buffer removal offset is defined to be constant across the two or more buffering periods, the sum of the initial coded picture buffer removal delay and the initial coded picture buffer removal offset is defined to be constant starting from a current position within the video data stream.

Moreover, a system is provided. The system comprises an apparatus 200 as described above and a video decoder 300 as described above. The video decoder 300 is configured to receive the output video data stream of the apparatus 200. Moreover, the video decoder 300 is configured to decode the video from the output video data stream of the apparatus 200.

According to an embodiment, the system may, e.g., further comprise a video encoder 100. The apparatus 200 according to one or more embodimentsmay e.g., be configured to receive the video data stream from the video encoder 100 according to one or more embodiments as the input video data stream.

In particular, the third aspect of the invention relates to splicing, to an Initial Cpb Removal Delay and to an Initial Cpb Removal Offset Currently the specification indicates that the sum of Initial Cpb Removal Delay and Initial Cpb Removal Offset are constant within a CVS. The same constraint is expressed for the alternative timings. The Initial Cpb Removal Delay indicates the time that needs to pass for the first AU in the bitstream that initializes the decoder before sending the first AU for decoding. The Initial Cpb Removal Offset is a property of the bitstream that means that the AUs earliest arrival time in the decoder is not necessarily equidistant with respect to the time 0 at which the first AU arrive the decoder. It helps determining when the first bit of an AU can earliest reach the decoder.

The current constraint in the WC draft specification indicates that the sum of these two values needs to be constant within a CVS:

Over the entire CVS, for each value pair of i and j, the sum of nal_initial_cpb_removal_delay[i][j] and nal_initial_cpb_removal_offset[i][j] shall be constant, and the sum of nal_initial_alt_cpb_removal_delay[i][j] and nal_initial_alt_cpb_removal_offset[i][j] shall be constant.

The problem appears when editing or splicing bitstreams to form a new joint bitstream. It is desirable also to be able to indicate whether this property is fulfilled across the CVS boundary for the bitstream as having a different value of the sum could lead to buffer underruns or overflows.

Therefore, in an embodiment an indication is carried in the bitstream that from a certain point in the bitstream on (e.g. splicing point), the value constraint regarding the constant sum of InitCpbRemovalDelay and InitCpbRemovalDelayOffset (and the alternative counterparts) is reset and the sums before and after the point in the bitstream may be different. Unless this indication is present in the bitstream the sum stays constant.

For instance:

When concatenationFlag is equal to 0, it is a constraint of bitstream conformance that the sum of InitCpbRemovalDelay and InitCpbRemovalDelayOffset is constant across buffering periods.

Otherwise, sum of InitCpbRemovalDelay and InitCpbRemovalDelayOffset does not have to be constant across buffering periods. The values of InitCpbRemovalDelay and InitCpbRemovalDelayOffset are updated to account for the arrival times.

In an embodiment, if several bitstreams are spliced, at each splicing point a concatenation flag may, e.g., define whether the sum stays constant or not.

In the following, the fourth aspect of the invention is now described in detail.

In accordance with the fourth aspect of the invention, a video data stream is provided. The video data stream has a video encoded thereinto. Moreover, the video data stream comprises an indication (e.g., a general_same_pic_timing_in_all_ols_flag) indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication (e.g., a general_same_pic_timing_in_all_ols_flag) has a first value, then the non-scalable nested picture timing supplemental enhancement information message of said network abstraction layer unit of said access unit is defined to apply to all output layer sets of the plurality of output layer sets of said access unit. If the indication (e.g., a general_same_pic_timing_in_all_ols_flag) has a value being different from the first value, then the indication does not define whether or not the non-scalable nested picture timing supplemental enhancement information message of said network abstraction layer unit of said access unit applies to all output layer sets of the plurality of output layer sets of said access unit.

According to an embodiment, for example, if the indication (e.g., a general_same_pic_timing_in_all_ols_flag) has the first value, then said network abstraction layer unit does not comprise any other supplemental enhancement information message that is different from a picture timing supplemental enhancement information message.

In an embodiment, e.g., if the indication (e.g., a general_same_pic_timing_in_all_ols_flag) has the first value, then said network abstraction layer unit does not comprise any other supplemental enhancement information message.

According to an embodiment, for example, if the indication (e.g., a general_same_pic_timing_in_all_ols_flag) has the first value, then for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

In an embodiment, if the indication (e.g., a general_same_pic_timing_in_all_ols_flag) has the first value, then for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

Moreover, a video encoder 100 may, e.g., be provided. The video encoder 100 is configured to encode a video into a video data stream. Moreover, the video encoder 100 is configured to generate the video data stream such that the video data stream comprises an indication (e.g., a general_same_pic_timing_in_all_ols_flag) indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication (e.g., a general_same_pic_timing_in_all_ols_flag) has a first value, then the non-scalable nested picture timing supplemental enhancement information message of said network abstraction layer unit of said access unit is defined to apply to all output layer sets of the plurality of output layer sets of said access unit. If the indication (e.g., a general_same_pic_timing_in_all_ols_flag) has a value being different from the first value, then the indication does not define whether or not the non-scalable nested picture timing supplemental enhancement information message of said network abstraction layer unit of said access unit applies to all output layer sets of the plurality of output layer sets of said access unit.

According to an embodiment, for example, if the indication (e.g., a general_same_pic_timing_in_all_ols_flag) has the first value, then the video encoder 100 is configured to generate the video data stream such that said network abstraction layer unit does not comprise any other supplemental enhancement information message that is different from a picture timing supplemental enhancement information message.

In an embodiment, e.g., if the indication (e.g., a general_same_pic_timing_in_all_ols_flag) has the first value, then the video encoder 100 is configured to generate the video data stream such that said network abstraction layer unit does not comprise any other supplemental enhancement information message.

According to an embodiment, for example, if the indication (e.g., a general_same_pic_timing_in_all_ols_flag) has the first value, then the video encoder 100 may, e.g., be configured to generate the video data stream such that for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

In an embodiment, e.g., if the indication (e.g., a general_same_pic_timing_in_all_ols_flag) has the first value, then the video encoder 100 may, e.g., be configured to generate the video data stream such that for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

Furthermore, an apparatus 200 for receiving an input video data stream is provided. The input video data stream has a video encoded thereinto. The apparatus 200 is configured to generate an processed video data stream from the input video data stream. Moreover, the apparatus 200 is configured to generate the processed video data stream such that the processed video data stream comprises an indication (e.g., a general_same_pic_timing_in_all_ols_flag) indicating whether or not a non-scalable nested picture timing supplemental enhancement information message of a network abstraction layer unit of an access unit of the plurality of access units of a coded video sequence of a one or more coded video sequences of the processed video data stream is defined to apply to all output layer sets of a plurality of output layer sets of said access unit. If the indication (e.g., a general_same_pic_timing_in_all_ols_flag) has a first value, then the non-scalable nested picture timing supplemental enhancement information message of said network abstraction layer unit of said access unit is defined to apply to all output layer sets of the plurality of output layer sets of said access unit. If the indication (e.g., a general_same_pic_timing_in_all_ols_flag) has a value being different from the first value, then the indication does not define whether or not the non-scalable nested picture timing supplemental enhancement information message of said network abstraction layer unit of said access unit applies to all output layer sets of the plurality of output layer sets of said access unit.

According to an embodiment, for example, if the indication (e.g., a general_same_pic_timing_in_all_ols_flag) has the first value, then the apparatus 200 is configured to generate the processed video data stream such that said network abstraction layer unit does not comprise any other supplemental enhancement information message that is different from a picture timing supplemental enhancement information message.

In an embodiment, e.g., if the indication (e.g., a general_same_pic_timing_in_all_ols_flag) has the first value, then the apparatus 200 is configured to generate the processed video data stream such that said network abstraction layer unit does not comprise any other supplemental enhancement information message.

According to an embodiment, for example, if the indication (e.g., a general_same_pic_timing_in_all_ols_flag) has the first value, then the apparatus 200 may, e.g., be configured to generate the processed video data stream such that for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

In an embodiment, e.g., if the indication (e.g., a general_same_pic_timing_in_all_ols_flag) has the first value, then the apparatus 200 may, e.g., be configured to generate the processed video data stream such that for each network abstraction layer unit, which comprises a non-scalable nested picture timing supplemental enhancement information message, of each access unit of the plurality of access units of each of the one or more coded video sequences of the processed video data stream, said network abstraction layer unit does not comprise any other supplemental enhancement information message that is different from a picture timing supplemental enhancement information message, or does not comprise any other supplemental enhancement information message.

Moreover, a video decoder 300 for receiving a video data stream having a video stored therein is provided. The video decoder 300 is configured to decode the video from the video data stream. The video data stream comprises an indication (e.g., a general_same_pic_timing_in_all_ols_flag) indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit. If the indication (e.g., a general_same_pic_timing_in_all_ols_flag) has a first value, then the non-scalable nested picture timing supplemental enhancement information message of said network abstraction layer unit of said access unit is defined to apply to all output layer sets of the plurality of output layer sets of said access unit. If the indication (e.g., a general_same_pic_timing_in_all_ols_flag) has a value being different from the first value, then the indication does not define whether or not the non-scalable nested picture timing supplemental enhancement information message of said network abstraction layer unit of said access unit applies to all output layer sets of the plurality of output layer sets of said access unit. The video decoder 300 is configured to decode the video depending on said indication.

According to an embodiment, for example, if the indication (e.g., a general_same_pic_timing_in_all_ols_flag) has the first value, then said network abstraction layer unit does not comprise any other supplemental enhancement information message that is different from a picture timing supplemental enhancement information message.

In an embodiment, e.g., if the indication (e.g., a general_same_pic_timing_in_all_ols_flag) has the first value, then said network abstraction layer unit does not comprise any other supplemental enhancement information message. The video decoder 300 is configured to decode the video depending on said indication.

According to an embodiment, for example, if the indication (e.g., a general_same_pic_timing_in_all_ols_flag) has the first value, then for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

In an embodiment, e.g., if the indication (e.g., a general_same_pic_timing_in_all_ols_flag) has the first value, then for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

Furthermore, a system is provided. The system comprises an apparatus 200 as described above and a video decoder 300 as described above. The video decoder 300 is configured to receive the processed video data stream of the apparatus 200. Moreover, the video decoder 300 is configured to decode the video from the output video data stream of the apparatus 200.

According to an embodiment, the system may, e.g., further comprise a video encoder 100. The apparatus 200 may, e.g., be configured to receive the video data stream from the video encoder 100 as the input video data stream.

In particular, the fourth aspect of the invention relates to constraining PT SEI to not be paired with other HRD SEIs when general_same_pic_timing_in_all_ols_flag equal to 1

The VVC draft specification comprises a flag called general_same_pic_timing_in_all_ols_flag in the general HRD parameter structure which the following semantics:

general_same_pic_timing_in_all_ols_flag equal to 1 specifies that the non-scalable-nested PT SEI message in each AU applies to the AU for any OLS in the bitstream and no scalable-nested PT SEI messages are present.

general_same_pic_timing_in_all_ols_flag equal to 0 specifies that the non-scalable-nested PT SEI message in each AU may or may not apply to the AU for any OLS in the bitstream and scalable-nested PT SEI messages may be present.

In general, when an OLS sub-bitstream is extracted from an original bitstream (comprises OLS data plus non-OLS data), corresponding HRD-related timing/buffer information for the target OLS in the form of Buffering Period, Picture Timing and Decoding Unit Information SEI messages which are encapsulated in so called scalable-nesting SEI messages are decapsulated. This decapsulated SEI messages are subsequently used to replace the non-scalable nested HRD SEI information in the original bitstream. However, in many scenarios, the content of some messages, e.g. the Picture Timing SEI message, may remain the same when a layer is dropped, i.e. from one OLS to a sub-set thereof. Therefore, general_same_pic_timing_in_all_ols_flag provides a shortcut so that only BP and DUI SEI messages are to be replaced, but the PT SEI in the original bitstream may stay in effect, i.e. it is simply not removed during extraction when general_same_pic_timing_in_all_ols_flag is equal to 1. Therefore, no replacement PT SEI message needs to be encapsulated in the scalable-nesting SEI message carrying the replacement BP and DUI SEI messages and no bitrate overhead is introduced for this information.

However, in the state-of-the-art, the PT SEI message is allowed to be carried within one SEI NAL unit (NAL unit=network abstraction layer unit) jointly with other HRD SEI messages, i.e. BP, PT and SEI messages may all be encapsulated within the same Prefix SEI NAL unit. Hence, an extractor would have to do a deeper inspection of such an SEI NAL unit to understand the comprised messages and when only one of the comprised messages (PT) is to be kept during the extraction procedure, it would be required to practically re-write the show SEI NAL units (i.e. remove non-PT SEI messages). In order to avoid this cumbersome low-level processing and allow an extractor to operate on the non-parameter-set portion of a bitstream entirely on the NAL unit level, it is part of the invention that a bitstream constraint disallows such bitstream construction. In one embodiment, the constraint is phrased as follows:

general_same_pic_timing_in_all_ols_flag equal to 1 specifies that the non-scalable-nested PT SEI message in each AU applies to the AU for any OLS in the bitstream and no scalable-nested PT SEI messages are present.

general_same_pic_timing_in_all_ols_flag equal to 0 specifies that the non-scalable-nested PT SEI message in each AU may or may not apply to the AU for any OLS in the bitstream and scalable-nested PT SEI messages may be present. When general_same_pic_timing_in_all_ols_flag equal to 1, it is a constraint of bitstream conformance that all general SEI messages in the bitstream containing an SEI message with payload type equal to 1 (Picture Timing) shall not contain SEI messages with payload type unequal to 1.

In the following, the fifth aspect of the invention is now described in detail.

In accordance with the fifth aspect of the invention, a video data stream is provided. The video data stream has a video encoded thereinto. Moreover, the video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements is defined to have the same size in every one of the scalable nested supplemental enhancement information messages of the video data stream or of the portion of the video data stream and in in every one of the non-scalable nested supplemental enhancement information messages of the video data stream or of the portion of the video data stream.

In an embodiment, the video data stream may, e.g., comprise a plurality of access units, wherein each access unit of the plurality of access units may, e.g., be assigned to one of a plurality of pictures of the video. The portion of the video data stream may, e.g., be an access unit of the plurality of access units of the video data stream. Each syntax element of the one or more syntax elements of the plurality of syntax elements may, e.g., be defined to have the same size in every one of the scalable nested supplemental enhancement information messages of the access unit.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the access unit and in in every one of the non-scalable nested supplemental enhancement information messages of the access unit.

In an embodiment, the portion of the video data stream may, e.g., be a coded video sequence of the video data stream. Each syntax element of the one or more syntax elements of the plurality of syntax elements may, e.g., be defined to have the same size in every one of the scalable nested supplemental enhancement information messages of the coded video sequence.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the coded video sequence and in in every one of the non-scalable nested supplemental enhancement information messages of the coded video sequence.

In an embodiment, each syntax element of the one or more syntax elements of the plurality of syntax elements may, e.g., be defined to have the same size in every one of the scalable nested supplemental enhancement information messages of the video data stream.

According to an embodiment, each syntax element of the one or more syntax elements of the plurality of syntax elements may, e.g., be defined to have the same size in every one of the scalable nested supplemental enhancement information messages of the video data stream and in in every one of the non-scalable nested supplemental enhancement information messages of the video data stream.

In an embodiment, the video data stream or the portion of the video data stream may, e.g., comprise at least one buffering period supplemental enhancement information message, wherein said buffering period supplemental enhancement information message defines the size for each syntax element of the one or more syntax elements of the plurality of syntax elements.

According to an embodiment, said buffering period supplemental enhancement information message comprises, for defining the size for each syntax element of the one or more syntax elements of the plurality of syntax elements, at least one of a bp_cpb_initial_removal_delay_length_minus1 element,
a bp_cpb_removal_delay_length_minus1 element,
a bp_dpb_output_delay_length_minus1 element,
a bp_du_cpb_removal_delay_increment_length_minus1 element,
a bp_dpb_output_delay_du_length_minus1 element.

In an embodiment, for each access unit of a plurality of access units of the video data stream, which comprises a scalable-nested buffering period supplemental enhancement information message, said access unit may, e.g., also comprise a non-scalable-nested buffering period supplemental enhancement information message.

According to an embodiment, for each single-layer access unit of a plurality of single-layer access units of the video data stream, which comprises a scalable-nested buffering period supplemental enhancement information message, said single-layer access unit may, e.g., also comprise a non-scalable-nested buffering period supplemental enhancement information message.

Moreover, a video encoder 100 is provided. The video encoder 100 is configured to encode a video into a video data stream. Moreover, the video encoder 100 is configured to generate the video data stream such that the video data stream comprises one or more scalable nested supplemental enhancement information messages. Furthermore, the video encoder 100 is configured to generate the video data stream such that the one or more scalable nested supplemental enhancement information messages comprise a plurality of syntax elements. Moreover, the video encoder 100 is configured to generate the video data stream such that each syntax element of one or more syntax elements of the plurality of syntax elements is defined to have a same size in every one of the scalable nested supplemental enhancement information messages of the video data stream or of a portion of the video data stream.

According to an embodiment, the video encoder 100 may, e.g., be configured to generate the video data stream such that the video data stream may, e.g., comprise one or more non-scalable nested supplemental enhancement information messages. The video encoder 100 may, e.g., be configured to generate the video data stream such that the one or more scalable nested supplemental enhancement information messages and the one or more non-scalable nested supplemental enhancement information message comprise the plurality of syntax elements. The video encoder 100 may, e.g., be configured to generate the video data stream such that each syntax element of the one or more syntax elements of the plurality of syntax elements may, e.g., be defined to have the same size in every one of the scalable nested supplemental enhancement information messages of the video data stream or of the portion of the video data stream and in in every one of the non-scalable nested supplemental enhancement information messages of the video data stream or of the portion of the video data stream.

In an embodiment, the video encoder 100 may, e.g., be configured to generate the video data stream such that the video data stream may, e.g., comprise a plurality of access units, wherein each access unit of the plurality of access units may, e.g., be assigned to one of a plurality of pictures of the video. The portion of the video data stream may, e.g., be an access unit of the plurality of access units of the video data stream. The video encoder 100 may, e.g., be configured to generate the video data stream such that each syntax element of the one or more syntax elements of the plurality of syntax elements may, e.g., be defined to have the same size in every one of the scalable nested supplemental enhancement information messages of the access unit.

According to an embodiment, the video encoder 100 may, e.g., be configured to generate the video data stream such that the video data stream may, e.g., comprise one or more non-scalable nested supplemental enhancement information messages. The video encoder 100 may, e.g., be configured to generate the video data stream such that the one or more scalable nested supplemental enhancement information messages and the one or more non-scalable nested supplemental enhancement information message comprise the plurality of syntax elements. The video encoder 100 may, e.g., be configured to generate the video data stream such that each syntax element of the one or more syntax elements of the plurality of syntax elements may, e.g., be defined to have the same size in every one of the scalable nested supplemental enhancement information messages of the access unit and in in every one of the non-scalable nested supplemental enhancement information messages of the access unit.

In an embodiment, the portion of the video data stream may, e.g., be a coded video sequence of the video data stream. The video encoder 100 may, e.g., be configured to generate the video data stream such that each syntax element of the one or more syntax elements of the plurality of syntax elements may, e.g., be defined to have the same size in every one of the scalable nested supplemental enhancement information messages of the coded video sequence.

According to an embodiment, the video encoder 100 may, e.g., be configured to generate the video data stream such that the video data stream may, e.g., comprise one or more non-scalable nested supplemental enhancement information messages. The video encoder 100 may, e.g., be configured to generate the video data stream such that the one or more scalable nested supplemental enhancement information messages and the one or more non-scalable nested supplemental enhancement information message comprise the plurality of syntax elements. The video encoder 100 may, e.g., be configured to generate the video data stream such that each syntax element of the one or more syntax elements of the plurality of syntax elements may, e.g., be defined to have the same size in every one of the scalable nested supplemental enhancement information messages of the coded video sequence and in in every one of the non-scalable nested supplemental enhancement information messages of the coded video sequence.

In an embodiment, the video encoder 100 may, e.g., be configured to generate the video data stream such that each syntax element of the one or more syntax elements of the plurality of syntax elements may, e.g., be defined to have the same size in every one of the scalable nested supplemental enhancement information messages of the video data stream.

According to an embodiment, the video encoder 100 may, e.g., be configured to generate the video data stream such that each syntax element of the one or more syntax elements of the plurality of syntax elements may, e.g., be defined to have the same size in every one of the scalable nested supplemental enhancement information messages of the video data stream and in in every one of the non-scalable nested supplemental enhancement information messages of the video data stream.

In an embodiment, the video encoder 100 may, e.g., be configured to generate the video data stream such that the video data stream or the portion of the video data stream may, e.g., comprise at least one buffering period supplemental enhancement information message, wherein said buffering period supplemental enhancement information message defines the size for each syntax element of the one or more syntax elements of the plurality of syntax elements.

According to an embodiment, the video encoder 100 may, e.g., be configured to generate the video data stream such that said buffering period supplemental enhancement information message comprises, for defining the size for each syntax element of the one or more syntax elements of the plurality of syntax elements, at least one of a bp_cpb_initial_removal_delay_length_minus1 element,
a bp_cpb_removal_delay_length_minus1 element,
a bp_dpb_output_delay_length_minus1 element,
a bp_du_cpb_removal_delay_increment_length_minus1 element,
a bp_dpb_output_delay_du_length_minus1 element.

In an embodiment, the video encoder 100 may, e.g., be configured to generate the video data stream such that for each access unit of a plurality of access units of the video data stream, which comprises a scalable-nested buffering period supplemental enhancement information message, said access unit may, e.g., also comprise a non-scalable-nested buffering period supplemental enhancement information message.

According to an embodiment, the video encoder 100 may, e.g., be configured to generate the video data stream such that for each single-layer access unit of a plurality of single-layer access units of the video data stream, which comprises a scalable-nested buffering period supplemental enhancement information message, said single-layer access unit may, e.g., also comprise a non-scalable-nested buffering period supplemental enhancement information message.

Furthermore, an apparatus 200 for receiving an input video data stream is provided. The input video data stream has a video encoded thereinto. The apparatus 200 is configured to generate an output video data stream from the input video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream. The apparatus 200 is configured to process the one or more scalable nested supplemental enhancement information messages.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements is defined to have the same size in every one of the scalable nested supplemental enhancement information messages of the video data stream or of the portion of the video data stream and in in every one of the non-scalable nested supplemental enhancement information messages of the video data stream or of the portion of the video data stream. The apparatus 200 is configured to process the one or more scalable nested supplemental enhancement information messages and the one or more non-scalable nested supplemental enhancement information messages.

In an embodiment, the video data stream may, e.g., comprise a plurality of access units, wherein each access unit of the plurality of access units may, e.g., be assigned to one of a plurality of pictures of the video. The portion of the video data stream may, e.g., be an access unit of the plurality of access units of the video data stream. Each syntax element of the one or more syntax elements of the plurality of syntax elements may, e.g., be defined to have the same size in every one of the scalable nested supplemental enhancement information messages of the access unit.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the access unit and in in every one of the non-scalable nested supplemental enhancement information messages of the access unit. The apparatus 200 may, e.g., be configured to process the one or more scalable nested supplemental enhancement information messages and the one or more non-scalable nested supplemental enhancement information messages.

In an embodiment, the portion of the video data stream may, e.g., be a coded video sequence of the video data stream. Each syntax element of the one or more syntax elements of the plurality of syntax elements may, e.g., be defined to have the same size in every one of the scalable nested supplemental enhancement information messages of the coded video sequence.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the coded video sequence and in in every one of the non-scalable nested supplemental enhancement information messages of the coded video sequence. The apparatus 200 may, e.g., be configured to process the one or more scalable nested supplemental enhancement information messages and the one or more non-scalable nested supplemental enhancement information messages.

In an embodiment, each syntax element of the one or more syntax elements of the plurality of syntax elements may, e.g., be defined to have the same size in every one of the scalable nested supplemental enhancement information messages of the video data stream.

According to an embodiment, each syntax element of the one or more syntax elements of the plurality of syntax elements may, e.g., be defined to have the same size in every one of the scalable nested supplemental enhancement information messages of the video data stream and in in every one of the non-scalable nested supplemental enhancement information messages of the video data stream. The apparatus 200 may, e.g., be configured to process the one or more scalable nested supplemental enhancement information messages and the one or more non-scalable nested supplemental enhancement information messages.

In an embodiment, the video data stream or the portion of the video data stream may, e.g., comprise at least one buffering period supplemental enhancement information message, wherein said buffering period supplemental enhancement information message defines the size of the one or more of the plurality of syntax elements. The apparatus 200 may, e.g., be configured to process the at least one buffering period supplemental enhancement information message.

According to an embodiment, said buffering period supplemental enhancement information message comprises, for defining the size of the one or more of the plurality of syntax elements, at least one of a bp_cpb_initial_removal_delay_length_minus1 element,
a bp_cpb_removal_delay_length_minus1 element,
a bp_dpb_output_delay_length_minus1 element,
a bp_du_cpb_removal_delay_increment_length_minus1 element,
a bp_dpb_output_delay_du_length_minus1 element.

In an embodiment, for each access unit of a plurality of access units of the video data stream, which comprises a scalable-nested buffering period supplemental enhancement information message, said access unit may, e.g., also comprise a non-scalable-nested buffering period supplemental enhancement information message. The apparatus 200 may, e.g., be configured to process the scalable nested supplemental enhancement information messages and the non-scalable nested supplemental enhancement information messages.

According to an embodiment, for each single-layer access unit of a plurality of single-layer access units of the video data stream, which comprises a scalable-nested buffering period supplemental enhancement information message, said single-layer access unit may, e.g., also comprise a non-scalable-nested buffering period supplemental enhancement information message. The apparatus 200 may, e.g., be configured to process the scalable nested supplemental enhancement information messages and the non-scalable nested supplemental enhancement information messages.

Moreover, a video decoder 300 for receiving a video data stream having a video stored therein is provided. The video decoder 300 is configured to decode the video from the video data stream. The video data stream comprises one or more scalable nested supplemental enhancement information messages. The one or more scalable nested supplemental enhancement information messages comprise a plurality of syntax elements. Each syntax element of one or more syntax elements of the plurality of syntax elements is defined to have a same size in every one of the scalable nested supplemental enhancement information messages of the video data stream or of a portion of the video data stream. The video decoder 300 is configured to decode the video depending on the one or more syntax elements of the plurality of syntax elements.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the video data stream or of the portion of the video data stream and in in every one of the non-scalable nested supplemental enhancement information messages of the video data stream or of the portion of the video data stream.

In an embodiment, the video data stream may, e.g., comprise a plurality of access units, wherein each access unit of the plurality of access units may, e.g., be assigned to one of a plurality of pictures of the video. The portion of the video data stream may, e.g., be an access unit of the plurality of access units of the video data stream. Each syntax element of the one or more syntax elements of the plurality of syntax elements may, e.g., be defined to have the same size in every one of the scalable nested supplemental enhancement information messages of the access unit.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the access unit and in in every one of the non-scalable nested supplemental enhancement information messages of the access unit.

In an embodiment, the portion of the video data stream may, e.g., be a coded video sequence of the video data stream. Each syntax element of the one or more syntax elements of the plurality of syntax elements may, e.g., be defined to have the same size in every one of the scalable nested supplemental enhancement information messages of the coded video sequence.

According to an embodiment, the video data stream may, e.g., comprise one or more non-scalable nested supplemental enhancement information messages. The one or more scalable nested supplemental enhancement information messages and the one or more non-scalable nested supplemental enhancement information message comprise the plurality of syntax elements. Each syntax element of the one or more syntax elements of the plurality of syntax elements may, e.g., be defined to have the same size in every one of the scalable nested supplemental enhancement information messages of the coded video sequence and in in every one of the non-scalable nested supplemental enhancement information messages of the coded video sequence.

In an embodiment, each syntax element of the one or more syntax elements of the plurality of syntax elements may, e.g., be defined to have the same size in every one of the scalable nested supplemental enhancement information messages of the video data stream.

According to an embodiment, each syntax element of the one or more syntax elements of the plurality of syntax elements may, e.g., be defined to have the same size in every one of the scalable nested supplemental enhancement information messages of the video data stream and in in every one of the non-scalable nested supplemental enhancement information messages of the video data stream.

In an embodiment, the video data stream or the portion of the video data stream may, e.g., comprise at least one buffering period supplemental enhancement information message, wherein said buffering period supplemental enhancement information message defines the size for each syntax element of the one or more syntax elements of the plurality of syntax elements.

According to an embodiment, said buffering period supplemental enhancement information message comprises, for defining the size for each syntax element of the one or more syntax elements of the plurality of syntax elements, at least one of
a bp_cpb_initial_removal_delay_length_minus1 element,
a bp_cpb_removal_delay_length_minus1 element,
a bp_dpb_output_delay_length_minus1 element,
a bp_du_cpb_removal_delay_increment_length_minus1 element,
a bp_dpb_output_delay_du_length_minus1 element.

In an embodiment, for each access unit of a plurality of access units of the video data stream, which comprises a scalable-nested buffering period supplemental enhancement information message, said access unit may, e.g., also comprise a non-scalable-nested buffering period supplemental enhancement information message.

According to an embodiment, for each single-layer access unit of a plurality of single-layer access units of the video data stream, which comprises a scalable-nested buffering period supplemental enhancement information message, said single-layer access unit may, e.g., also comprise a non-scalable-nested buffering period supplemental enhancement information message.

Furthermore, a system is provided. The system comprises an apparatus 200 as described above and a video decoder 300 as described above. The video decoder 300 is configured to receive the output video data stream of the apparatus 200. Moreover, the video decoder 300 configured to decode the video from the output video data stream of the apparatus 200.

According to an embodiment, the system may, e.g., further comprise a video encoder 100. The apparatus 200 may, e.g., be configured to receive the video data stream from the video encoder 100 as the input video data stream.

In particular, the fifth aspect of the invention relates to constraining all BP SEIs messages in a bitstream to indicate the same length of certain variable-length coded syntax elements and not be scalable-nested without a non-scalable nested variant in the same AU The buffering period SEI message, the picture timing SEI message and the decoding unit information SEI message are used to provide precise timing information for the NAL units within a bitstream to control their transition through the buffers of a decoder in conformance tests. Some syntax elements in the PT and DUI SEI message are coded with variable length and the length of these syntax elements is conveyed in the BP SEI message. This parsing dependency is a design trade-off. For the cost of not allowing PT and DUI SEI message parsing without parsing the associated BP SEI message first, the benefit of saving sending of those length syntax elements at each PT or DUI SEI message is achieved. As the BP SEI message (once per multiple frames) is send much less often than PT (once per each frame) or DUI SEI messages (multiple times per frame), a bit-saving is achieved through this common design trade-off similar as to how picture header structures can reduce the bit-cost of slice headers when many slices are used.

More specifically, the BP SEI message in the current VVC draft specification includes the syntax elements that are the root of parsing dependencies:

bp_cpb_initial_removal_delay_length_minus1 that specifies the coded length of alternative timing initial CPB removal delays of AUs in the PT SEI message and, bp_cpb_removal_delay_length_minus1 that specifies the coded length of CPB removal delays and removal delay offsets of AUs in the PT SEI message and, bp_dpb_output_delay_length_minus1 that specifies the coded length of DPB output delays of AUs in the PT SEI message and, bp_du_cpb_removal_delay_increment_length_minus1 that specifies the coded length of the individual and common CPB removal delays of DUs in the PT SEI message and the CPB removal delays of DUs in the DUI SEI message and, bp_dpb_output_delay_du_length_minus1 that specifies the coded length DPB output delays of AUs in the PT SEI message and in the DU SEI message.

However, a problem arises when a bitstream comprises multiple OLSs. While the BP/PT/DUI SEI messages that apply to the OLS that represents the bitstream are carried in a verbatim fashion in the bitstream are keeping track of the parsing dependency is trivial, other pairs of BP/PT/DUI SEI messages that correspond to the OLSs representing (sub-)bitstreams are to be carried in an encapsulated form in so-called scalable nesting SEI messages. Still, the parsing dependencies apply and given that the number of OLS might be very high, it is a considerable burden for a decoder or parser to keep track of the correct encapsulated BP SEI message for the sake of the parsing dependency when processing the encapsulated PT and DUI SEI messages. Especially, since those messages can also be encapsulated in different scalable nesting SEI messages.

Therefore, as part of the invention, in one embodiment, a bitstream constraint is established that the coded value of the respective syntax elements describing the lengths must be the same in all scalable-nested and non-scalable nested BP SEI messages in an AU. Therefore, a decoder or parser only needs to store the respective length values when parsing the first non-scalable BP SEI message in the AU and can resolve the parsing dependencies of all PT and DUI SEI message in the buffering periods that start at the respective AU, whether encapsulated in scalable-nesting SEI messages or not. The following is an example of the respective specification text:

It is a requirement of bitstream conformance that all scalable-nested and non-scalable nested buffering period SEI messages in an AU have the same respective value of
the syntax elements bp_cpb_initial_removal_delay_length_minus1, bp_cpb_removal_delay_length_minus1, bp_dpb_output_delay_length_minus1, bp_du_cpb_removal_delay_increment_length_minus1, bp_dpb_output_delay_du_length_minus1.

In another embodiment, the constraint is expressed only for scalable-nested BP SEI messages that are in the buffering period that the current non-scalable-nested BP SEI message determine as follows:

It is a requirement of bitstream conformance that all scalable nested buffering period SEI messages in a buffering period have the same respective value of the syntax elements bp_cpb_initial_removal_delay_length_minus1, bp_cpb_removal_delay_length_minus1, bp_dpb_output_delay_length_minus1, bp_du_cpb_removal_delay_increment_length_minus1, bp_dpb_output_delay_du_length_minus1 then the non-scalable nested buffering period SEI messages of the buffering period.

Here, the BPs of the bitstream define the scope of the constraints for the scalable-nested BPs from one scalable nested BP to the next scalable nested BP.

In another embodiment, the constraint is expressed for all AUs of the bitstream, e.g. as follows:

It is a requirement of bitstream conformance that all scalable-nested and non-scalable nested buffering period SEI messages in the bitstream have the same respective value of the syntax elements bp_cpb_initial_removal_delay_length_minus1, bp_cpb_removal_delay_length_minus1, bp_dpb_output_delay_length_minus1, bp_du_cpb_removal_delay_increment_length_minus1, bp_dpb_output_delay_du_length_minus1.

In another embodiment, the constraint is expressed only for the AUs in a CVS, so a smart encoder may still be able to facilitate the difference in duration of BPs in the bitstream for the coding of the relevant delay and offset syntax elements. Specification text would be as follows:

It is a requirement of bitstream conformance that all scalable-nested and non-scalable nested buffering period SEI messages in a CVS have the same respective value of the syntax elements bp_cpb_initial_removal_delay_length_minus1, bp_cpb_removal_delay_length_minus1, bp_dpb_output_delay_length_minus1, bp_du_cpb_removal_delay_increment_length_minus1, bp_dpb_output_delay_du_length_minus1.

Here, the constraint scope is the CVS.

More specifically, the buffering period or BP SEI message defines a so-called buffering period in which timings of individual pictures use the picture at the start of a buffering period as an anchor. The beginning of a buffering period is instrumental, for instance, to test conformance of random-access functionality in a bitstream.

Figure 7:
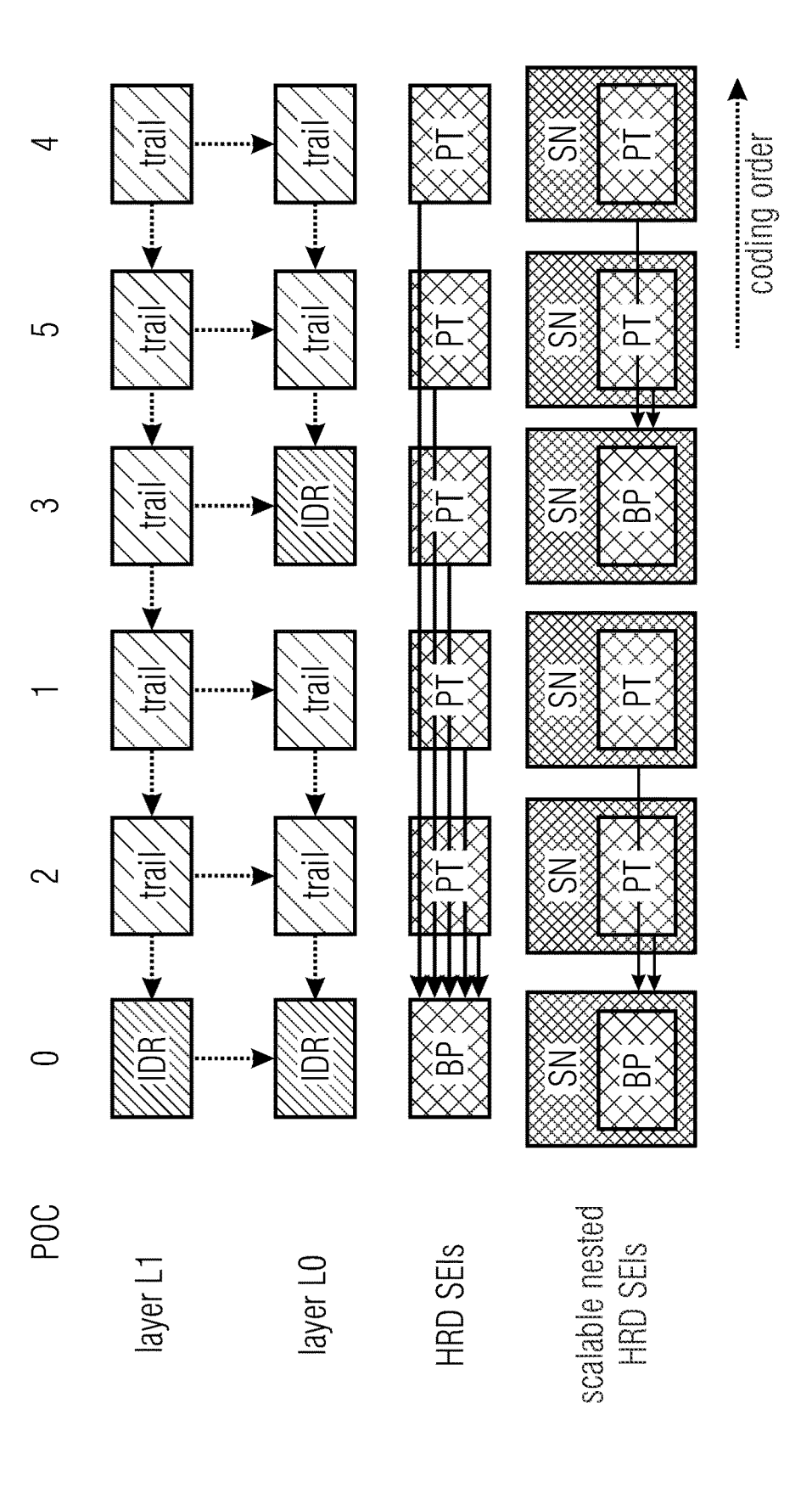
FIG. 7 illustrates two sets of HRD SEIs, scalable nested SEIs and non-scalable nested SEIs, in a two-layer bitstream according to an embodiment.

FIG. 7 illustrates two sets of HRD SEIs, scalable nested SEIs and non-scalable nested SEIs, in a two-layer bitstream according to an embodiment.

In a multi-layer scenario as shown in FIG. 7, for instance, the scalable-nested HRD SEIs provide a different buffering period setup (through the BP at POC 0 and POC 3) than the non-scalable nested SEIs (only POC 0) to be used when only layer L0 is extracted and played from POC3 onwards.

However, this also comes at the increased complexity cost of tracking the parsing dependencies between the PT and the individual BP messages as explained above which is undesirable. Therefore, as part of the invention, in one embodiment, it is prohibited to have scalable-nested BP SEI message in AUs without a non-scalable nested BP SEI message as follows:

It is a requirement of bitstream conformance that no scalable-nested BP SEI message shall be in an AU that does not contain a non-scalable-nested BP SEI message.

As the above usage scenario is limited to multi-layer bitstreams, in another embodiment, the related constraint is limited to single-layer bitstreams as follows:

It is a requirement of bitstream conformance that no scalable-nested BP SEI message shall be in a single-layer AU that does not contain a non-scalable-nested BP SEI message.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] ISO/IEC, ITU-T. High efficiency video coding. ITU-T Recommendation H.265|ISO/IEC 23008 10 (HEVC), edition 1, 2013; edition 2, 2014.

The invention claimed is:

1. A video decoder for receiving a video data stream having a video stored therein,
    wherein the video decoder is configured to decode the video from the video data stream,
    wherein the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit,
    wherein, if the indication has a first value, then the non-scalable nested picture timing supplemental enhancement information message of said network abstraction layer unit of said access unit is defined to apply to all output layer sets of the plurality of output layer sets of said access unit,
    wherein, if the indication has a value being different from the first value, then the indication does not define whether or not the non-scalable nested picture timing supplemental enhancement information message of said network abstraction layer unit of said access unit applies to all output layer sets of the plurality of output layer sets of said access unit,
    wherein the video decoder is configured to decode the video depending on said indication.

2. The video decoder according to claim 1,
    wherein, if the indication has the first value, then said network abstraction layer unit does not comprise any other supplemental enhancement information message with different picture timings.

3. The video decoder according to claim 1,
    wherein, if the indication has the first value, then all supplemental enhancement information messages have a same payload type.

4. The video decoder according to claim 1,
    wherein, if the indication has the first value, then said network abstraction layer unit does not comprise any other supplemental enhancement information message that is different from a picture timing supplemental enhancement information message.

5. The video decoder according to claim 1,
    wherein, if the indication has the first value, then said network abstraction layer unit does not comprise any other supplemental enhancement information message.

6. The video decoder according to claim 1,
    wherein, if the indication has the first value, then for each network abstraction layer unit, which comprises a non-scalable nested picture timing supplemental enhancement information message, of each access unit of the plurality of access units of a coded video sequence of the one or more coded video sequences, said network abstraction layer does not comprise any other supplemental enhancement information message that is different from a picture timing supplemental enhancement information message, or does not comprise any other supplemental enhancement information message.

7. The video decoder according to claim 1,
    wherein, if the indication has the first value, then for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

8. A video encoder,
    wherein the video encoder is configured to encode a video into a video data stream,
    wherein the video encoder is configured to generate the video data stream such that the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit,
    wherein, if the indication has a first value, then the non-scalable nested picture timing supplemental enhancement information message of said network abstraction layer unit of said access unit is defined to apply to all output layer sets of the plurality of output layer sets of said access unit,
    wherein, if the indication has a value being different from the first value, then the indication does not define whether or not the non-scalable nested picture timing supplemental enhancement information message of said network abstraction layer unit of said access unit applies to all output layer sets of the plurality of output layer sets of said access unit.

9. The video encoder according to claim 8,
    wherein, if the indication has the first value, then said network abstraction layer unit does not comprise any other supplemental enhancement information message with different picture timings.

10. The video encoder according to claim 8,
    wherein, if the indication has the first value, then all supplemental enhancement information messages have a same payload type.

11. The video encoder according to claim 8,
wherein, if the indication has the first value, then said network abstraction layer unit does not comprise any other supplemental enhancement information message that is different from a picture timing supplemental enhancement information message.

12. The video encoder according to claim 8,
wherein, if the indication has the first value, then said network abstraction layer unit does not comprise any other supplemental enhancement information message.

13. The video encoder according to claim 8,
wherein, if the indication has the first value, then the video encoder is configured to generate the video data stream such that for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

14. The video encoder according to claim 8,
wherein, if the indication has the first value, then the video encoder is configured to generate the video data stream such that for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

15. A non-transitory computer-readable medium storing a video data stream,
wherein the video data stream has a video encoded thereinto,
wherein the video data stream comprises an indication indicating whether or not a non-scalable nested picture timing supplemental enhancement information message of a network abstraction layer unit of an access unit of the plurality of access units of a coded video sequence of a one or more coded video sequences of the video data stream is defined to apply to all output layer sets of a plurality of output layer sets of said access unit,
wherein, if the indication has a first value, then the non-scalable nested picture timing supplemental enhancement information message of said network abstraction layer unit of said access unit is defined to apply to all output layer sets of the plurality of output layer sets of said access unit,
wherein, if the indication has a value being different from the first value, then the indication does not define whether or not the non-scalable nested picture timing supplemental enhancement information message of said network abstraction layer unit of said access unit applies to all output layer sets of the plurality of output layer sets of said access unit.

16. The non-transitory computer-readable medium storing the video data stream according to claim 15,
wherein, if the indication has the first value, then said network abstraction layer unit does not comprise any other supplemental enhancement information message with different picture timings.

17. The non-transitory computer-readable medium storing the video data stream according to claim 15,
wherein, if the indication has the first value, then all supplemental enhancement information messages have a same payload type.

18. The non-transitory computer-readable medium storing the video data stream according to claim 15,
wherein, if the indication has the first value, then said network abstraction layer unit does not comprise any other supplemental enhancement information message that is different from a picture timing supplemental enhancement information message.

19. The non-transitory computer-readable medium storing the video data stream according to claim 15,
wherein, if the indication has the first value, then said network abstraction layer unit does not comprise any other supplemental enhancement information message.

20. The non-transitory computer-readable medium storing the video data stream according to claim 15,
wherein, if the indication has the first value, then for each network abstraction layer unit, which comprises a non-scalable nested picture timing supplemental enhancement information message, of each access unit of the plurality of access units of a coded video sequence of the one or more coded video sequences, said network abstraction layer unit does not comprise any other supplemental enhancement information message that is different from a picture timing supplemental enhancement information message, or does not comprise any other supplemental enhancement information message.

21. The non-transitory computer-readable medium storing the video data stream according to claim 15,
wherein, if the indication has the first value, then for each network abstraction layer unit, which comprises a non-scalable nested picture timing supplemental enhancement information message, of each access unit of the plurality of access units of each of the one or more coded video sequences of the video data stream, said network abstraction layer unit does not comprise any other supplemental enhancement information message that is different from a picture timing supplemental enhancement information message, or does not comprise any other supplemental enhancement information message.

* * * * *